Sept. 26, 1967   H. N. LATHEY ET AL   3,343,505
CONFECTION OR ICING EXPRESSING AND DEPOSITING APPARATUS
Filed Nov. 5, 1965   14 Sheets-Sheet 1
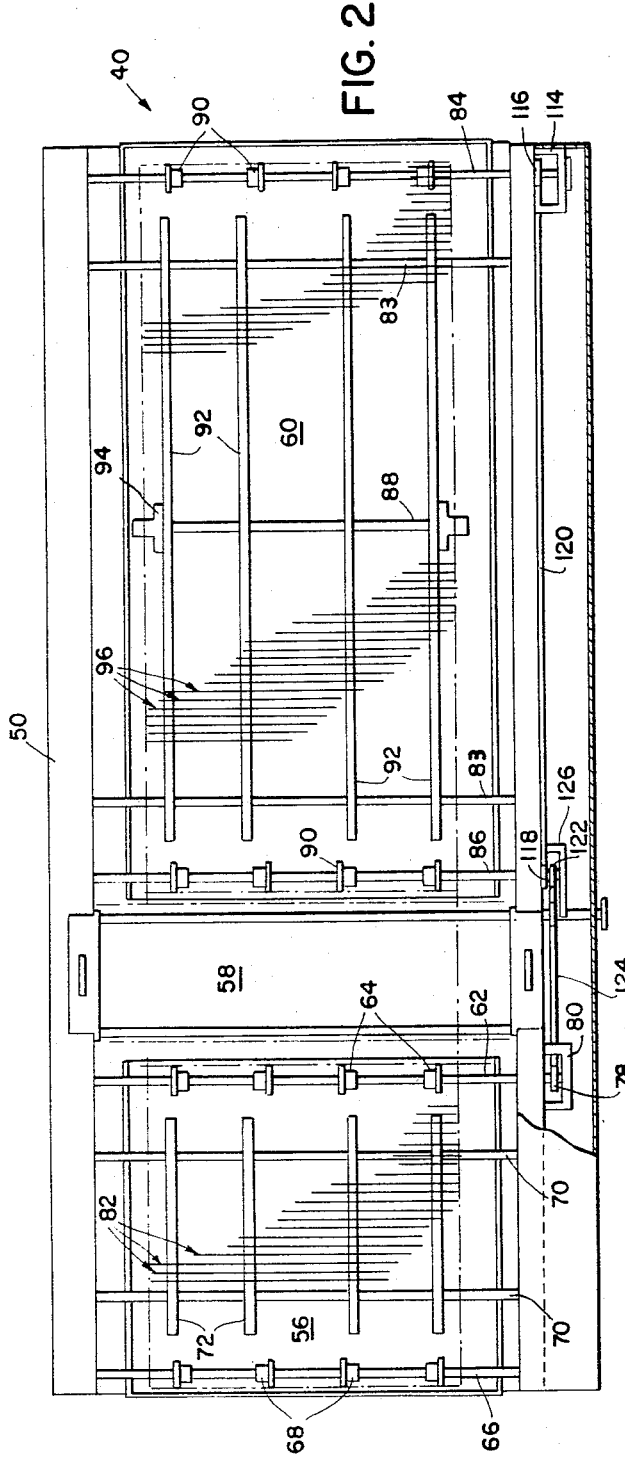
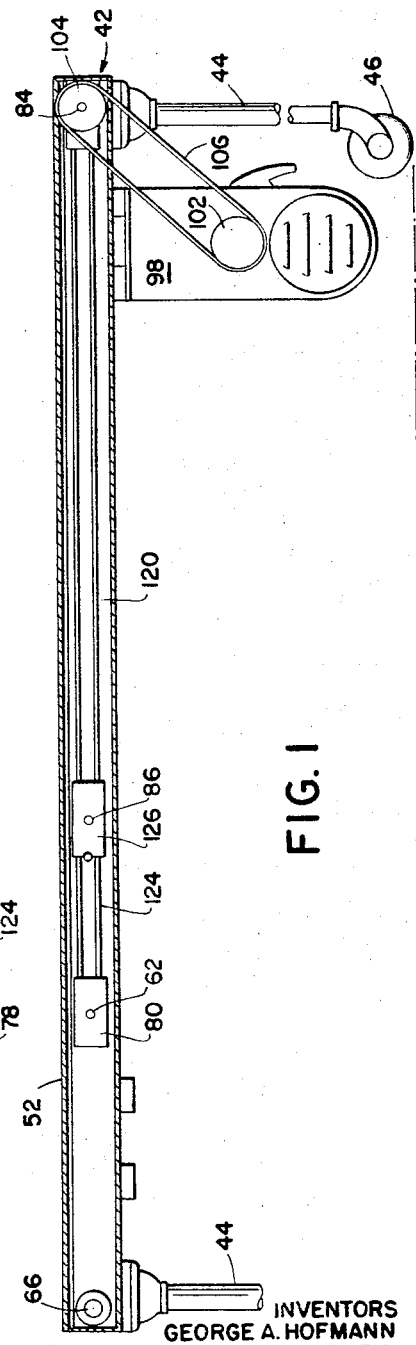
INVENTORS
GEORGE A. HOFMANN
HOWARD N. LATHEY
KURT PREUSS
ATTORNEYS Sept. 26, 1967   H. N. LATHEY ET AL   3,343,505
CONFECTION OR ICING EXPRESSING AND DEPOSITING APPARATUS
Filed Nov. 5, 1965   14 Sheets-Sheet 2
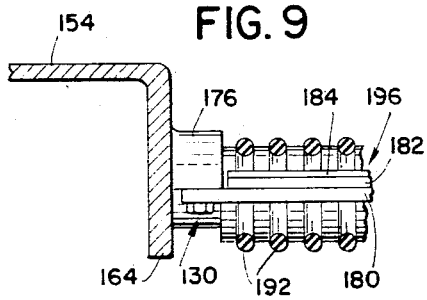
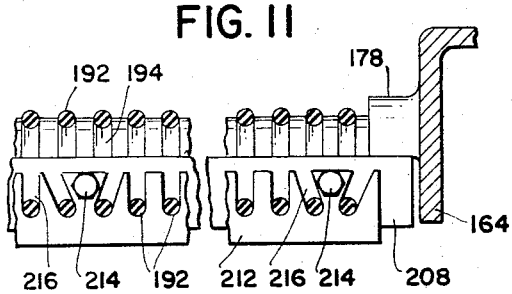
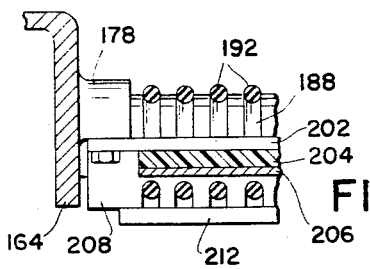
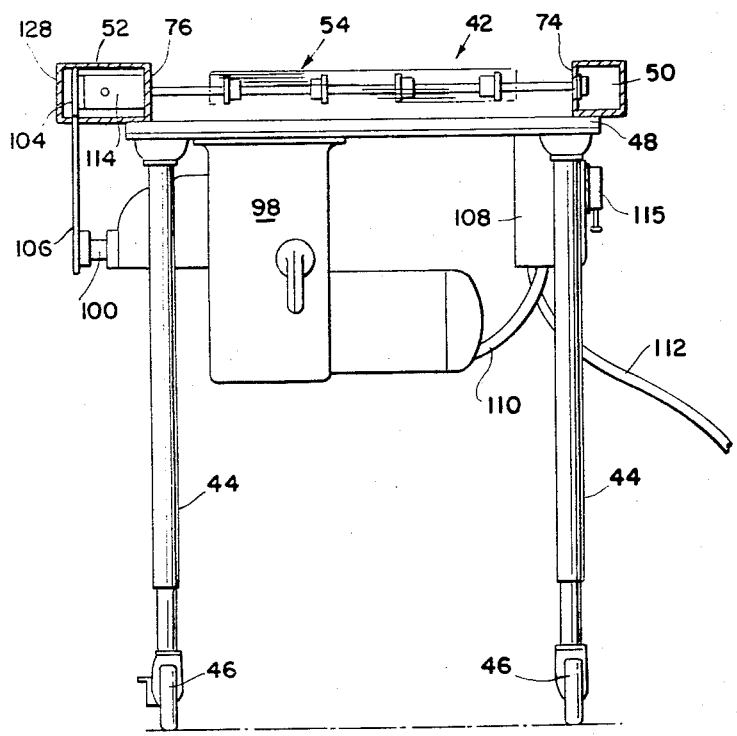
INVENTORS.
GEORGE A. HOFMANN
HOWARD N. LATHEY
KURT PREUSS
Lackenbach & Siegel
ATTORNEYS

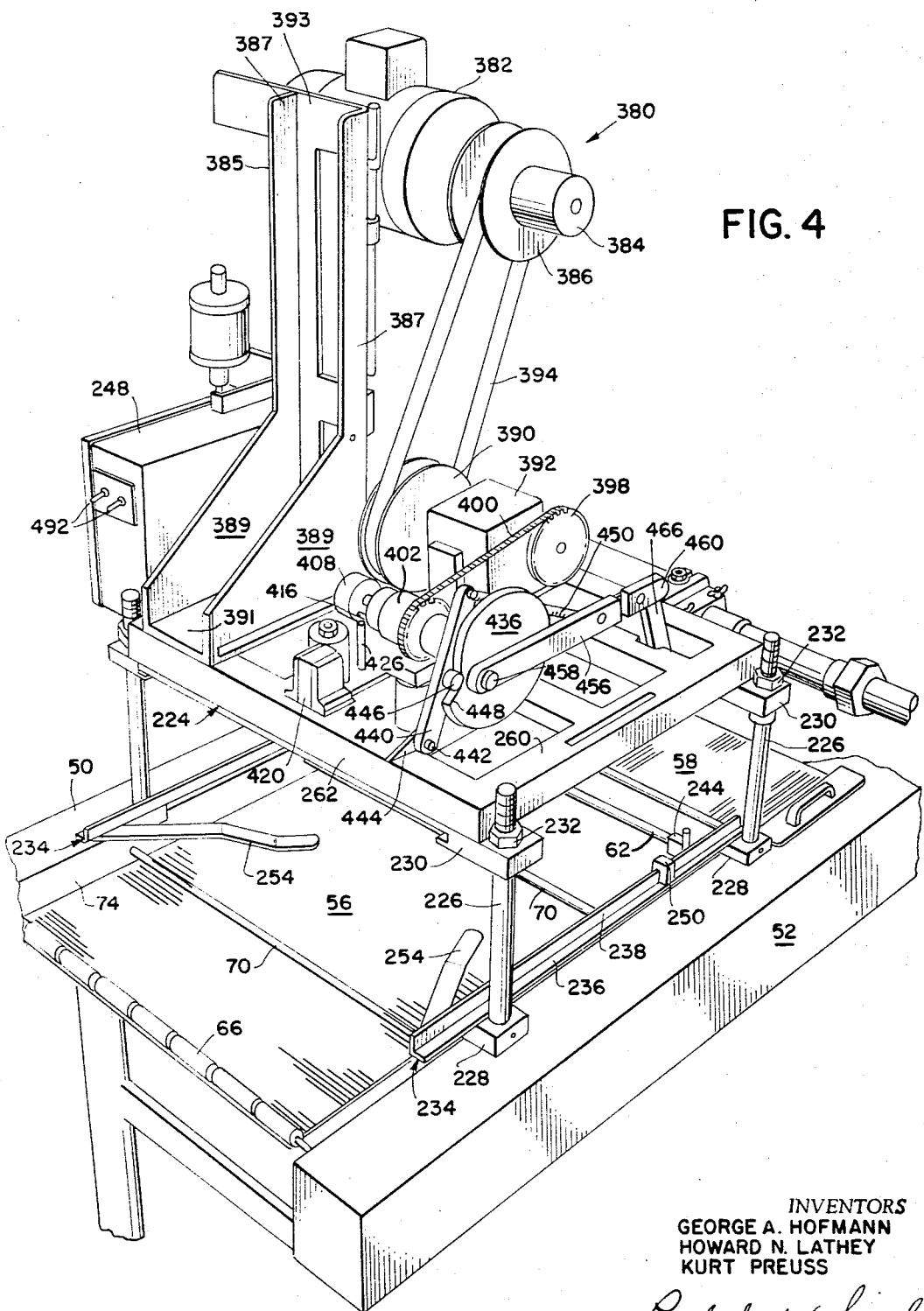

INVENTORS.
GEORGE A. HOFMANN
HOWARD N. LATHEY
KURT PREUSS

*Rackenbach & Siegel*
ATTORNEYS

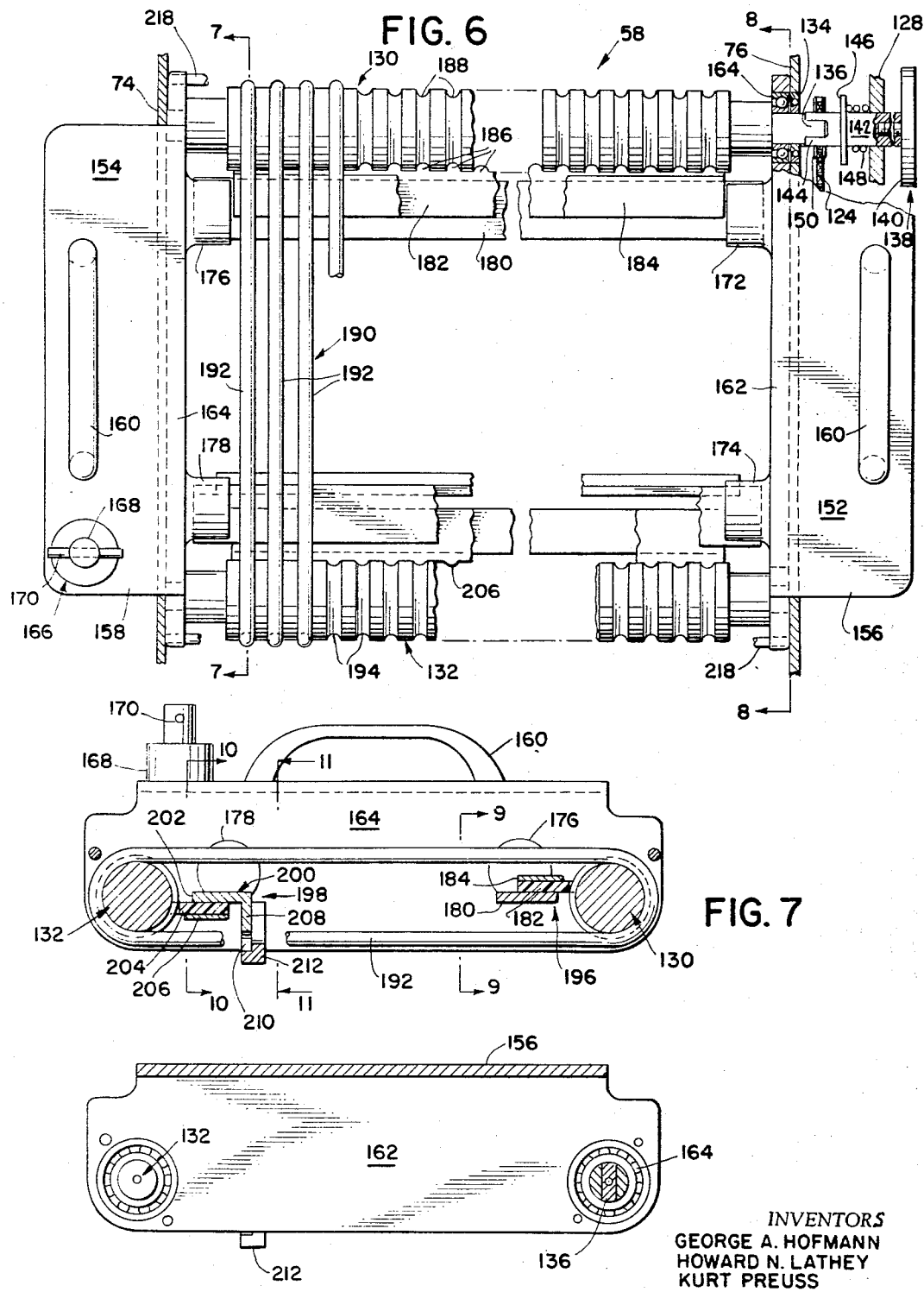

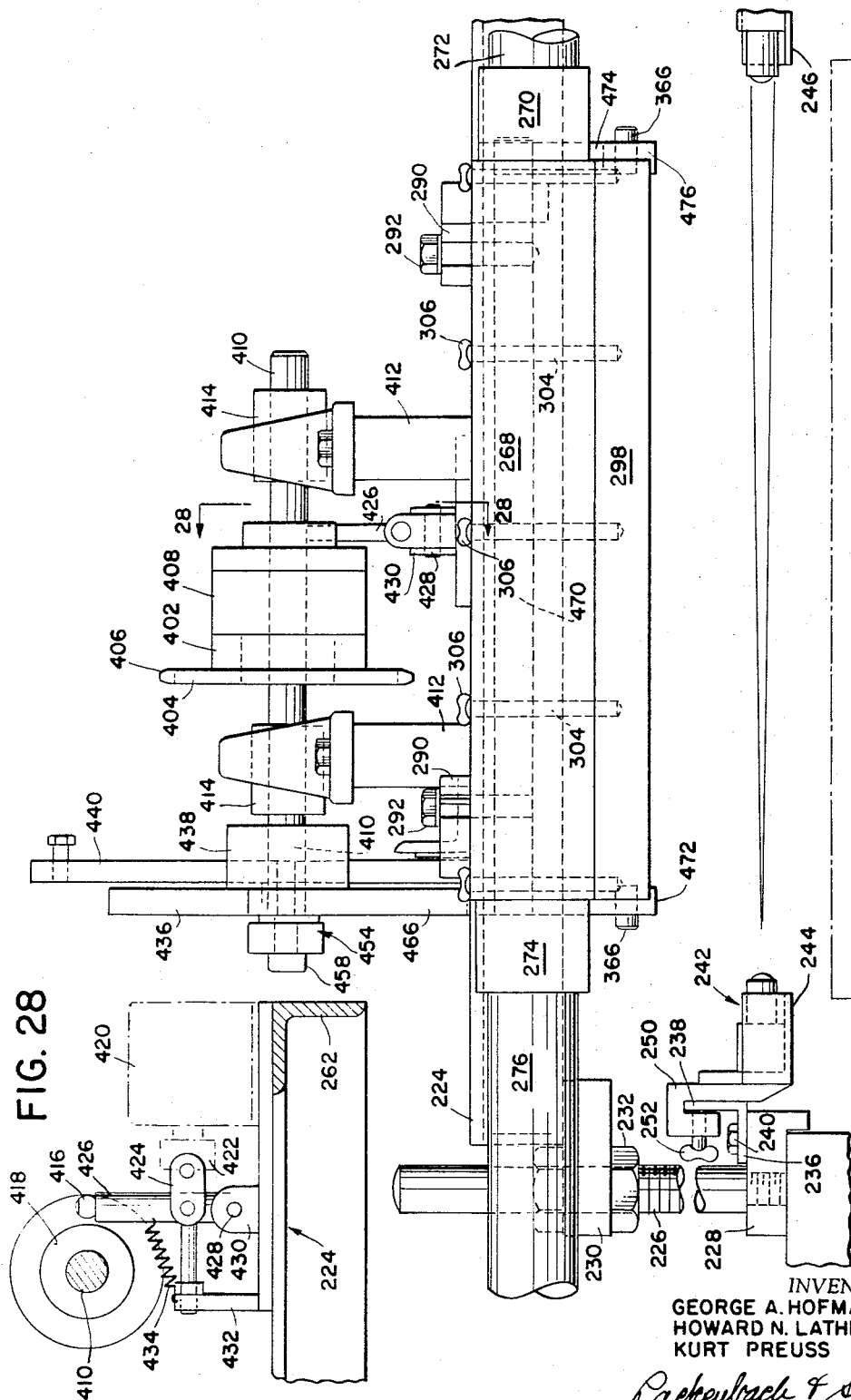

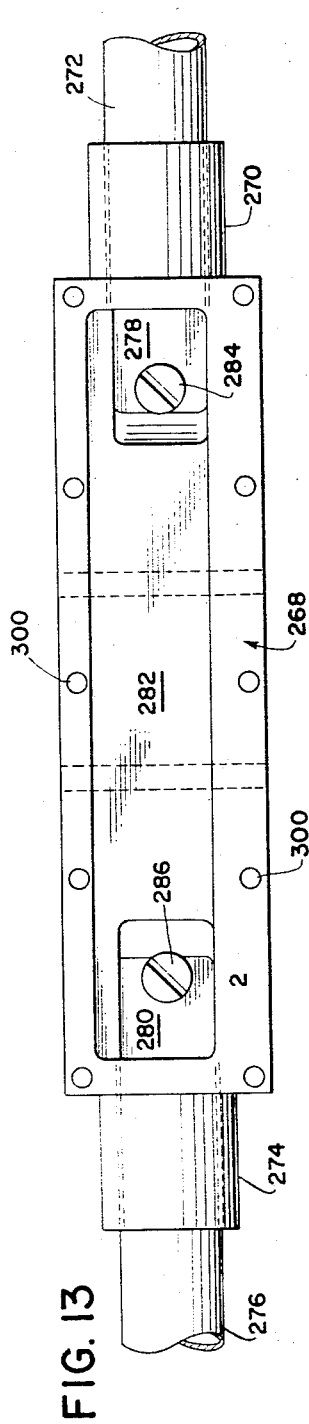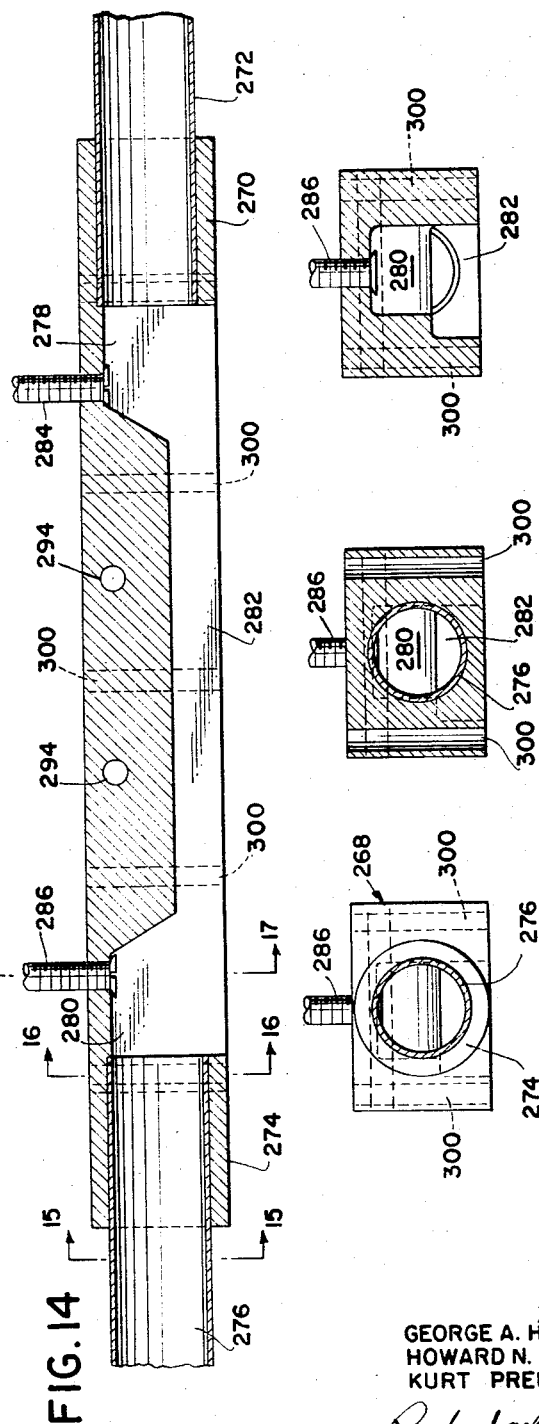

Sept. 26, 1967   H. N. LATHEY ETAL   3,343,505
CONFECTION OR ICING EXPRESSING AND DEPOSITING APPARATUS
Filed Nov. 5, 1965   14 Sheets-Sheet 8

INVENTORS
GEORGE A. HOFMANN
HOWARD N. LATHEY
KURT PREUSS

*Rachenbach & Siegel*
ATTORNEYS

Sept. 26, 1967     H. N. LATHEY ETAL     3,343,505
CONFECTION OR ICING EXPRESSING AND DEPOSITING APPARATUS
Filed Nov. 5, 1965     14 Sheets-Sheet 9

INVENTORS
GEORGE A. HOFMANN
HOWARD N. LATHEY
KURT PREUSS

*Rackenbach & Siegel*
ATTORNEYS

INVENTORS
GEORGE A. HOFMANN
HOWARD N. LATHEY
KURT PREUSS

ATTORNEYS

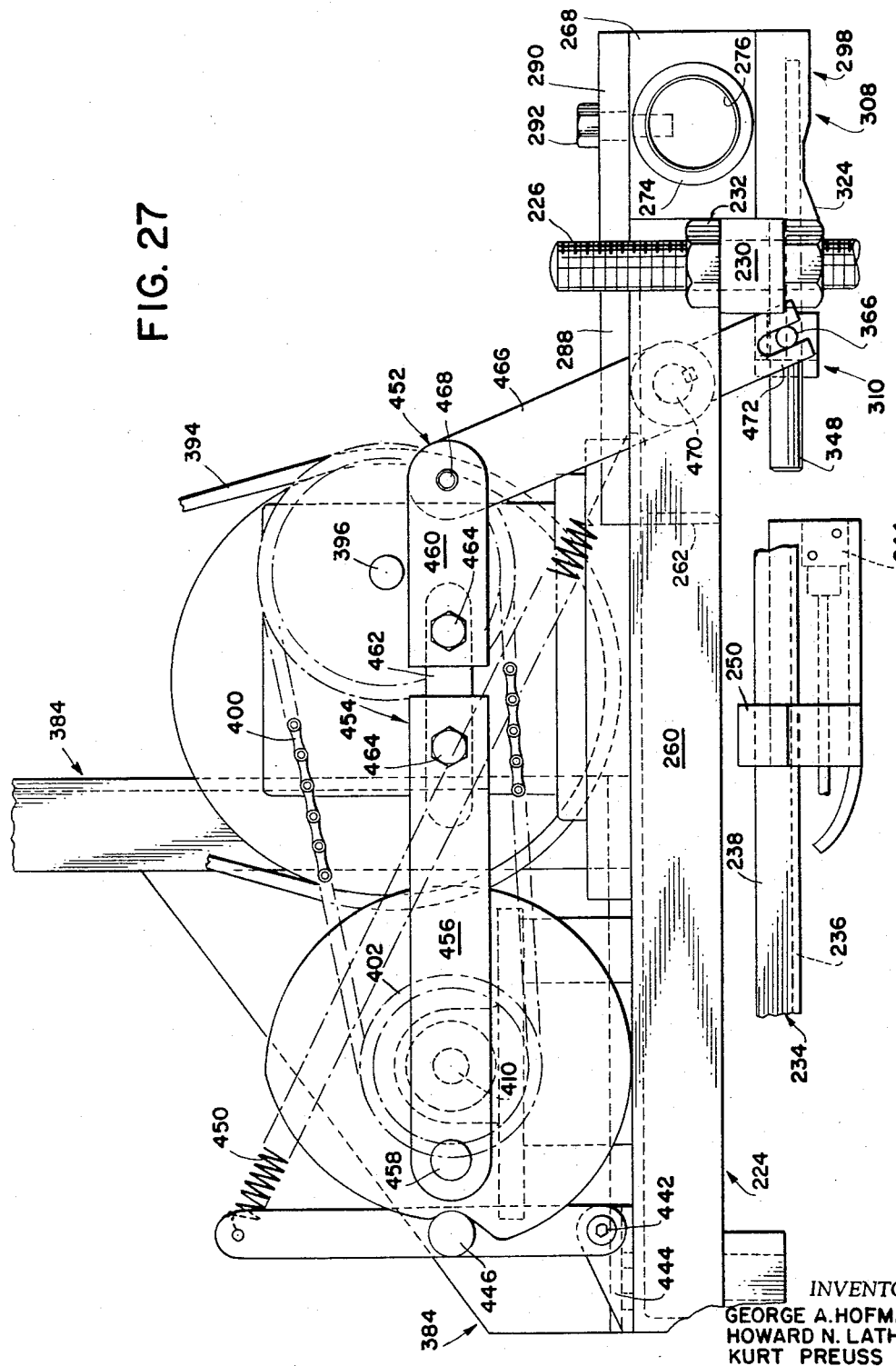

Sept. 26, 1967   H. N. LATHEY ETAL   3,343,505
CONFECTION OR ICING EXPRESSING AND DEPOSITING APPARATUS
Filed Nov. 5, 1965   14 Sheets-Sheet 12

INVENTORS
GEORGE A. HOFMANN
HOWARD N. LATHEY
KURT PREUSS

Rackenbach & Siegel
ATTORNEYS

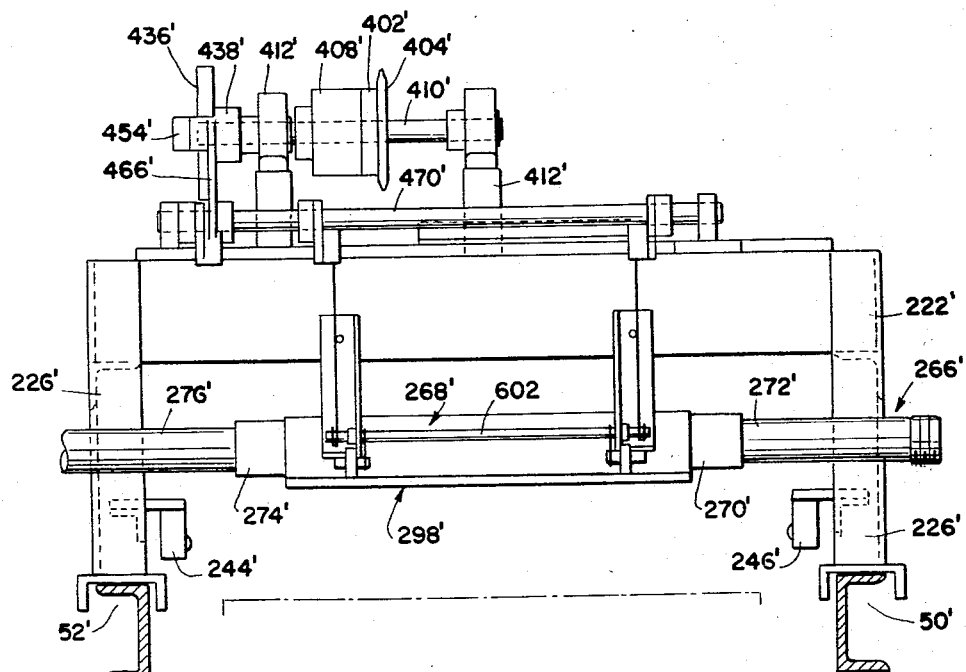
FIG. 32
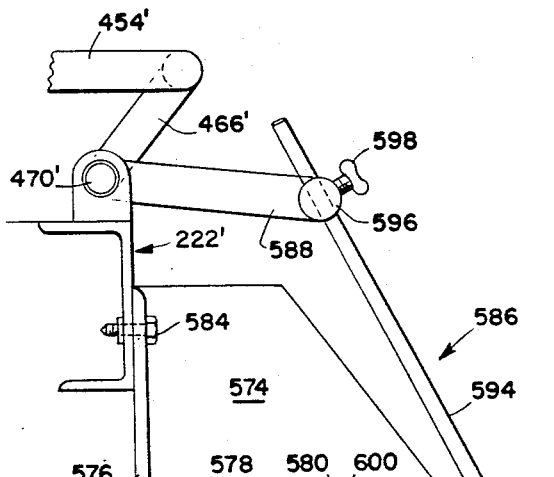
FIG. 33
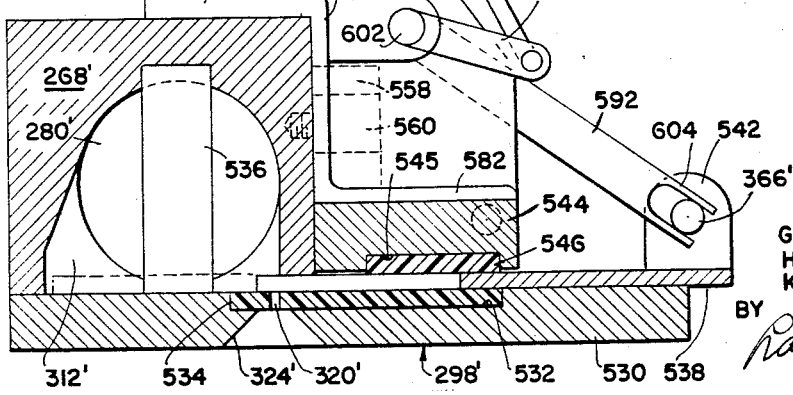
INVENTORS
GEORGE A. HOFMANN
HOWARD N. LATHEY
KURT PREUSS
BY Rachenbach & Siegel
ATTORNEYS Sept. 26, 1967  H. N. LATHEY ET AL  3,343,505
CONFECTION OR ICING EXPRESSING AND DEPOSITING APPARATUS
Filed Nov. 5, 1965  14 Sheets-Sheet 14

INVENTORS
GEORGE A. HOFMANN
HOWARD N. LATHEY
KURT PREUSS

*Bachenbach & Siegel*
ATTORNEYS

United States Patent Office 3,343,505
Patented Sept. 26, 1967

3,343,505
CONFECTION OR ICING EXPRESSING AND
DEPOSITING APPARATUS
Howard N. Lathey, Old Tappan, Kurt Preuss, Teaneck, and George A. Hofmann, Closter, N.J., assignors to Basic Foods, Inc., Englewood, N.J., a corporation of New York
Filed Nov. 5, 1965, Ser. No. 506,456
14 Claims. (Cl. 107—29)

Statement of the invention

The present invention pertains, generally, to expressing and depositing apparatus and, more particularly, to apparatus for periodically depositing on cookies, biscuits, cakes, and other edible products, uniform quantities of confections of semi-fluid consistency, such as fudges, jellies, soft dough, macaroons, melted fondants, marshmallow pastes, fig pastes, and the like.

Statement of the problem

Various techniques and methods are available today for depositing upon such edible products as cookies, cakes, biscuits, and the like, confections of semi-fluid consistency. The confections that appear on products of this type can generically be termed "icing." The icing is expressed and deposited on the edible product in various designs, shapes, and contours to enhance its appearance, as well as to perform other functions. It is considered readily apparent to those skilled in the art that the shape, contour and configuration of the cakes, and other edible products, which are usually sold in pans or containers fabricated of foil, aluminum, and the like, also varies.

Present day methods and techniques for expressing and depositing confections upon the aforesaid edible products inherently have certain problem. One of the important and significant problems is to insure that the confection is evenly and uniformly expressed and deposited upon the product to obtain the desired design and aesthetic appearance. Accordingly, it is necessary that the method or technique, and the apparatus for performing it, is accurate. In this connection, accuracy is of the utmost importance to avoid waste. Additionally, accuracy is an important criteria since it is desirable that the apparatus for performing the method or technique be kept clean and neat, to minimize the down-time required for repair, replacement, or both.

Moreover, as pointed out above, the edible products are usually made available to the consuming public in pans or containers of various shapes, contours and configurations. It is of course necessary, therefore, that the confection (which will hereinafter be referred to generically as "icing") expressed and deposited upon the edible product conform to its limiting shape, contour and configuration which of course is the same as that of its pan or container.

Objects of the invention

Having in mind each and every one of the foregoing problems, and others that will be readily apparent to those skilled in the art, it will be understood that a primary object of the present invention is to provide expressing and depositing apparatus for periodically and accurately depositing on edible products uniform quantities of a confection or icing of semi-fluid consistency, such as fudges, jellies, soft-doughs, macaroons, melted fondants, marshmallow pastes, fig pastes, and the like, in a predetermined design.

Another primary object of this invention, in addition to each of the foregoing objects, is to provide expressing and depositing apparatus for periodically and accurately expressing and depositing on edible products that are in a state of translation through the medium of a moving endless belt uniform quantities of a confection or icing of semi-fluid consistency in a predetermined design.

Yet another primary object of the present invention, in addition to each of the foregoing objects, is to provide expressing and depositing apparatus for periodically and accurately expressing and depositing on edible products that are in a state of translation through the medium of a moving belt uniform quantities of a confection or icing of semi-fluid consistency in a predetermined design, said apparatus being constructed and arranged to handle confections or icings of varying consistencies.

A further primary object of the present invention, in addition to each of the foregoing objects, is to provide expressing and depositing apparatus for periodically and accurately expressing and depositing on edible products that are in a state of translation through the medium of a moving conveyor belt uniform quantities of a confection or icing in a predetermined design, substantially irrespective of the fact that the edible products are being translated by said conveyor belt at a high production rate.

A still further primary object of this invention, in addition to each of the foregoing objects, is to provide expressing and depositing apparatus for periodically and accurately expressing and depositing on edible products uniform quantities of a confection or icing in a predetermined design, said apparatus being constructed and arranged to substantially avoid waste. In this connection, the expressing and depositing apparatus of the present invention is constructed and arranged to inherently and automatically scrape and clean the operating elements, components and parts thereof, to insure cleanliness and neatness, and to thus subtantially minimize the down-time required for repair, or replacement, or both.

A still further primary object of this invention, in addition to each of the foregoing objects, is to provide expressing and depositing apparatus for periodically and accurately expressing and depositing on edible products a confection or icing of semi-fluid consistency in a predetermined pattern, said apparatus being constructed and arranged to enable the performance of a continuous operation in such a manner that inadvertent displacement of the edible products is substantially eliminated.

In addition to each of the foregoing objects, it is a primary object of the present invention to provide expressing and depositing apparatus for periodically and accurately depositing in a predetermined design on edible products uniform quantities of a confection or icing of semi-fluid consistency, said apparatus being consrtucted and arranged to insure accurate expression of the deposits on the edible products during operation, as well as to insure clean breaking of the icing when the flow is to cease without disturbing its shape.

Additionally, it is a primary object of this invention to provide expressing and depositing apparatus for periodically expressing and depositing, in a predetermined pattern, uniform quantities of a confection or icing of semi-fluid consistency on edible products, said apparatus being constructed and arranged of substantially unitary sub-assemblies enabling them to be changed, repaired or replaced with facility, and with a minimal expenditure of effort, further insuring that the down-time for this purpose, and others of a similar nature, are maintained at a minimum.

The present invention resides in the combination, construction, arrangement and disposition of the various component parts or elements incorporated in an improved expressing and depositing apparatus constructed in accordance herewith. It will best be understood, and objects and important features of it other than those specifically enumerated above, will become apparent when consideration is given to the following detailed description which, when taken in conjunction with the annexed drawings, describes, discloses, shows and illustrates preferred embodiments of the present invention and what is presently considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Description

In the drawings:

FIG. 1 is a side elevational view in detail of a conveyor table constructed in accordance with the principles of the present invention;

FIG. 2 is a plan detailed view of the conveyor table shown in FIG. 1;

FIG. 3 is a front detailed elevational view of the conveyor table illustrated in FIGS. 1 and 2;

FIG. 4 is a rear isometric view of a confection or icing expressing and depositing assembly constructed in accordance with the principles of the present invention, illustrated as being mounted upon the conveyor table of FIGS. 1–3;

FIG. 6 is a detailed view in plan, and partially in section, of one of the elements of the conveyor table shown in FIGS. 1–3;

FIG. 7 is a cross-sectional view taken along the lines 7—7 of FIG. 6;

FIG. 8 is a cross-sectional view taken along the line 8—8 of FIG. 6;

FIG. 9 is a cross-sectional view taken along the line 9—9 of FIG. 7;

FIG. 10 is a cross-sectional view taken along the line 10—10 of FIG. 7;

FIG. 11 is a cross-sectional view taken along the line 11—11 of FIG. 7;

FIG. 12 is a schematic elevational view of the confection or icing expressing and depositing head of the present invention, showing a portion of a signal sending-and-receiving assembly, and a portion of the drive assembly;

FIG. 12A is a detailed view illustrating the bracket on which the signal sending-and-receiving assembly is mounted;

FIG. 13 is a bottom plan view of the mounting portion of the confection or icing expressing and depositing head;

FIG. 14 is an elevational view in section of the mounting portion of FIG. 13;

FIG. 15 is a cross-sectional view taken along the line 15—15 of FIG. 14;

FIG. 16 is a cross-sectional view taken along the line 16—16 of FIG. 14;

FIG. 17 is a cross-sectional view taken along the line 17—17 of FIG. 14;

FIG. 27 is a side elevational view, in detail, of the cam and linkage assemblies of the confection or icing expressing and depositing assembly;

FIG. 28 is a detail view illustrating an element for controlling the drive assembly of the expressing and depositing assembly;

FIG. 29 is a detailed isometric view illustrating an assembly for varying the output speed of the drive assembly;

FIG. 32 is a view similar to FIG. 12, showing a modification of an icing head constructed in accordance herewith;

FIG. 33 is a side elevational detail view, partially in section, of the modification shown in FIG. 32;

Figure 5:
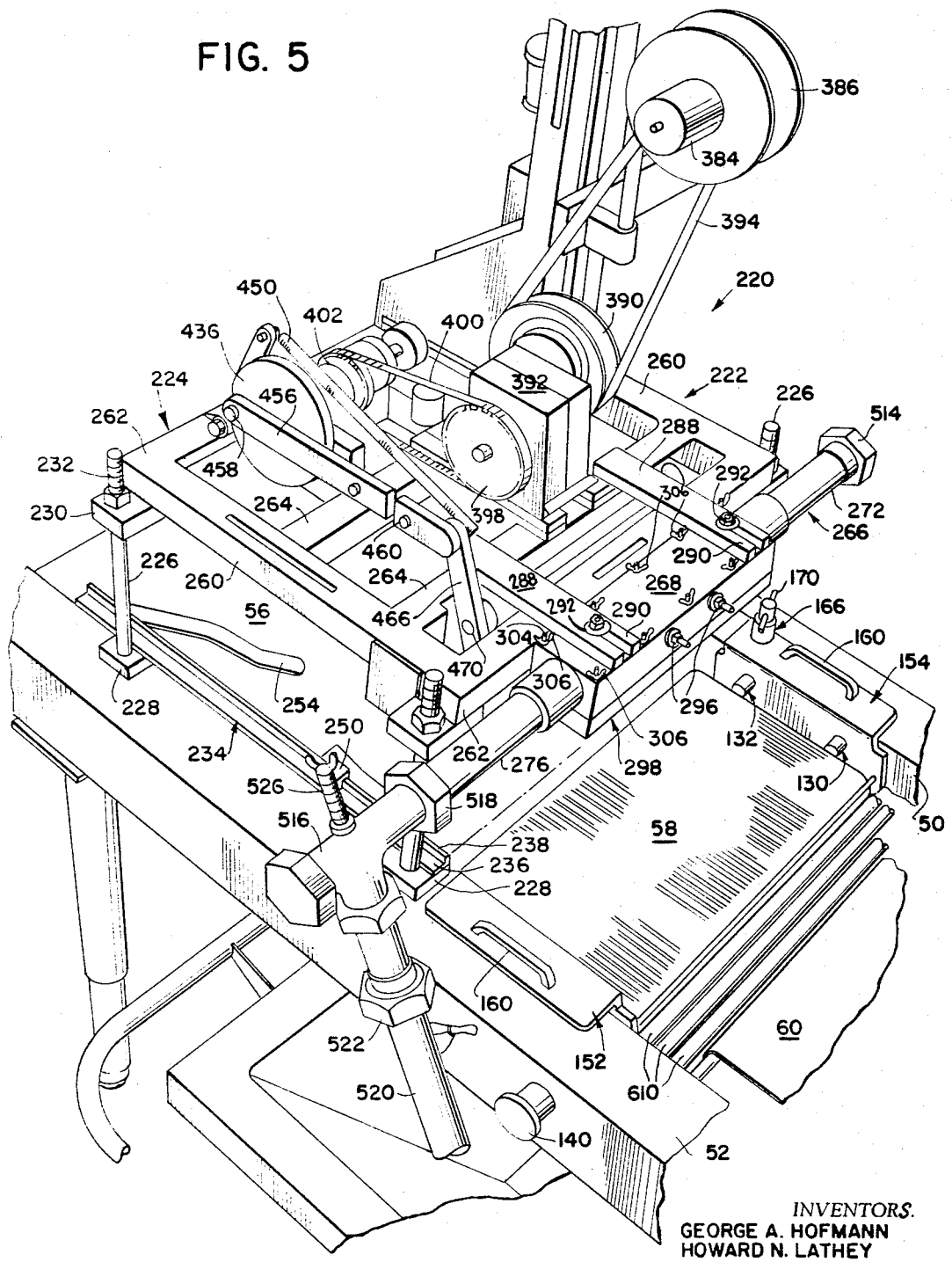
FIG. 5 is a view similar to FIG. 4, but taken from the front of the expressing and depositing assembly.

With reference now to the drawings, and particularly to FIGS. 1 to 3 thereof, expressing and depositing apparatus constructed in accordance with the principles of this invention, generally designated by the reference character 40, is illustrated therein.

The apparatus 40 comprises a conveyor table 42 which is mounted upon four legs 44. The legs 44 are of telescoping construction enabling the height of the table to be adjusted. In addition, each of the legs comprise caster wheels 46, enabling the conveyor table 42 to be translated between locations.

The table 42 comprises, further, a table top 48. A hollow standard 50 is mounted on the top 48 and extends completely of its length along one side thereof. Another hollow standard 52 is mounted on the table top, and extends completely of its length along the other side thereof. This hollow standard is of greater width than the standard 50, for reasons to be pointed out hereinafter.

An endless conveyor 54 is operatively associated with the table 42 between the standards 50 and 52. The conveyor 54 comprises an infeed section 56, an insert section 58, and an outfeed section 60. The infeed section comprises a drive shaft 62 having a plurality of drive rollers non-rotatably positioned thereupon, a driven shaft 66 having a plurality of driven rollers 68 non-rotatably positioned thereupon, and a plurality of guide shafts 70. Guides 72 are operatively associated with the shafts 62, 66 and 70, which at one end thereof, are journalled within one wall 74 of the standard 50 in any suitable manner. The shafts 66 and 70 are similarly journalled within one wall 76 of the standard 52. The drive shaft 62, at its other end, is rotatably journalled within the standard 52, and extends into the hollow portion thereof. This shaft, at the end disposed within the standard 52, has a drive gear 78 of any suitable construction non-rotatably mounted thereupon. This end of the drive shaft is then rotatably journalled within a bracket 80. An infeed conveyor generally designated by the reference character 82 is operatively associated with and about the drive shaft 62, the driven shaft 66, and the guide shaft 70. The infeed conveyor 82 may be of any suitable construction, and for example, may be constructed of individual wire segments or portions, schematically illustrated by the solid lines extending transversely of the table 42, that are interconnected with one another in any suitable manner.

Similarly, the outfeed section 60 comprises a drive shaft 84, a drive shaft 86, and a plurality of guide shafts 83, 88. Drive rollers 90 are non-rotatably positioned upon the drive shafts 84 and 86. The drive shafts, at one end thereof are rotatably journalled within the wall 74 of the standard 50. The same is equally true with respect to the guide shafts 83, 88. The middle guide shaft, however, does not extend through the walls 74 or 76 of either of the standards 50 or 52, respectively, but rather is rotatably journalled with respect to guides 92 that extend longitudinally of the outfeed section 60. The middle shaft 88 is rotatably journalled with respect to the guides 92 in any suitable manner, as through the medium of journals 94. The other guide shafts 83 are similarly rotatably journalled with respect to these guides.

An endless conveyor belt generally designated by the reference character 96 is operatively associated with respect to the drive shafts 84 and 86. The belt 96, which may be of the same construction as the belt 82, extends completely about the drive shafts, and is additionally adapted to be guided by the guide shafts 83, and guided and supported by the guides 92. Of course, the guides 92 perform substantially the same function in substantially the same manner as the guides 72. If desired, the conveyor belt 96 may be of endless and imperforate construction, in which instance the belt may be constructed of an elastomeric material, such as neoprene rubber, as particularly illustrated in FIG. 2.

The table 42 comprises, still further, a variable speed motor 98 of any suitable construction which is adapted to drive the drive shafts 62, 84 and 86. The motor 98 comprises, in turn, an output shaft 100 on which there is mounted a pulley wheel 102. An other pulley wheel 104 is mounted upon that end of the drive shaft 84 which extends completely through and into the standard 52. An endless pulley belt 106 is positioned upon and extends completely about the pulleys 102 and 104. A control box or panel 108, of any suitable and conventional construction, is mounted upon the underside of the table 42. This control box or panel, which comprises the necessary on-off assemblies 115 of any suitable and conventional construction, is connected to the motor 98 by a suitable conductor 110. The control box or panel, in turn, is connected to an electrical source of supply by a conductor 112.

A bracket 114 is fixedly positioned within the standard 52 through which the drive shaft 84 extends. The shaft is rotatably journalled relative to the bracket 114, and has non-rotatably positioned thereupon a driving gear 116. A drive gear 118 of similar construction is non-rotatably positioned upon the end of the drive shaft 86 which extends through the wall 76 of the standard 52. An endless link-type drive chain 120 is operatively associated with and extends completely about the drive gears 116 and 118 to transfer the driving force from the motor 98 to the drive gear 116, and thence to the drive gear 118. Since the drive chain 120 may be of substantial length, it is within the scope of the present invention to position idling gears (not shown) along the length thereof and between the drive gears 116 and 118 for support purposes.

In addition to the drive gear 118, a transfer gear 122 is also non-rotatably mounted or positioned upon that end of the drive shaft 86 that extends into the hollow portion of the standard 52. Another endless link-type drive chain 124 extends between and is positioned completely about the gears 78 and 122 for transferring the driving force of the motor 98 to the former. The drive shaft 86 is rotatably journalled relative to a bracket 126 which also serves to protect the transmission comprised of the drive gear 118 and the transfer gear 122.

It is desirable that the standard 52 be constructed to provide access to the interior thereof to facilitate repair or replacement of any of the elements or parts just described positioned therewithin. To this end, the standard 52 preferably comprises, further, a wall 128 that is removably related to the standard (though not shown) in any suitable manner, such as by screws, or other suitable and conventional fastener assemblies.

As pointed out above, the table 42 comprises, in addition to the infeed section 56 and the outfeed section 60, an insert section 58. These three sections, when taken in conjunction, comprise the conveyor of the table 42 which causes the edible product to be enrobed to be translated completely of its length. The insert section 58, in addition to performing this function, comprises the wet section of the conveyor, that is, the section disposed at the location at which the confection or icing is applied to the edible products. It is considered readily apparent that since the wet section or insert section 58 is disposed at this location, this section of the conveyor should be removable. Accordingly, the insert section 58 will hereinafter be denoted as the removable wet section of the conveyor. It is emphasized that it is this location at which the dressing of the edible products takes place, in a manner hereinafter to be described in further detail.

The removable wet section 58 of the conveyor comprises a drive shaft 130 and a driven shaft 132. The drive shaft 130 is rotatably journalled relative to the wall 76 of the standard 52 through the medium of suitable and conventional journal bearings 134, and extends therethrough into the hollow portion of the standard. The other end of this drive shaft is similarly journalled relative to the wall 74 of the standard 50. Both ends of the driven shaft 132 are rotatably journalled relative to the standards 50 and 52 in a similar manner. Since the wet section 58 of the conveyor is removable, the end of the drive shaft 130 extending into the hollow portion of the standard 52 comprises a portion 136 of reduced diameter and substantially rectangular configuration adapted to be selectably engageable with a manually operable clutch assembly 138. This assembly comprises a knob 140 having a shaft 142 constructed to define a bifurcated end 144 adapted to be engaged with the reduced portion 136 of the drive shaft 130. A collar 146 is fixedly positioned upon the shaft 142. A biasing element or spring 148 is positioned between the collar 146 and the wall 128 of the standard 52 for biasing the clutch assembly 138 into engagement with the reduced portion 136. An idler 150 is non-rotatably mounted upon the shaft 142, and is adapted to be disposed in engagement with the links of the drive chain 124. When it is desired to remove wet section 58, the drive shaft 130 is disengaged from the chain 124 by causing the idler 150 to be disengaged therefrom. This is accomplished easily and with facility by simply manually grasping the knob 140 of the clutch assembly 138, and causing the disengagement of the reduced portion 136 relative to the bifurcated end 144.

The removable wet section 58 further comprises an L-shaped end wall 152 and an end wall 154 of similar configuration. The end wall 152 comprises a horizontally extending top leg 156 adapted to rest upon the standard 52 when the wet section is disposed in an operative position relative to the table 42. In a like manner, the end wall 154 comprises a horizontal top leg 158 adapted to rest upon the standard 50. Each of the end walls 152 and 154 comprise handles 160 to facilitate removal of the wet section from the table 42. The end wall 152 comprises further a vertically extending side leg 162 adapted to be disposed in abutment with the wall 76 of the standard 52 when the wet section is in its operative position. The drive shaft 130 is rotatably journalled relative to the side leg 162 by suitable journal bearings 164 which may be similar to the journal bearings 134. The driven shaft 132 is rotatably journalled with respect to the side leg 162 in a similar manner. The end wall 154 also comprises a vertically extending side leg 164 relative to which the drive shaft 130 and the driven shaft 132 are rotatably journalled in a like manner. The horizontal top leg 158 of the end wall 154 comprises a latch assembly 166 adapted to cooperate with the standard 50 for releasably latching that end of the removable wet section with respect to the conveyor table 42. The latch assembly 166 may be of any suitable and conventional construction, and for example, may comprise a projection (not shown) adapted to cooperate with a bayonet slot (also not shown) in the standard 50. To facilitate ease of handling, the latch assembly 166 comprises a rotatable barrel portion 168 having a handle 170.

The vertical side leg 162 and the vertical side leg 164 each comprise mounting bosses 172 and 174, and 176 and 178, respectively. A mounting bar 180 extends between the mounting bosses 172 and 176, and is affixed thereto in any suitable manner, such as through the medium of suitable fasteners (not shown). A scraper element 182 is adapted to be removably mounted upon the bar 180, and to this end, another mounting bar 184 is adapted to be removably connected with the bar 180 in any suitable manner, such as through the medium of suitable fasteners (not shown). The scraper element 182 may be fabricated of any suitable material, such as Teflon, and is adapted to perform the function of scraping and removing excess confection or icing from the drive shaft 130 that forms thereupon due to the fact that wet section 58 is located where the confection or icing is expressed and deposited upon the edible products translated by the conveyor table 42. To this end, and as clearly shown in FIG. 6, the scraper element 182 is configured and arranged to define a plurality of semi-annular projections 186 along one edge thereof. The projections 186 are in turn adapted to be disposed within a corresponding number of grooves 188 formed in and about the periphery of the drive shaft 130. Like the infeed and outfeed sections 56 and 60, respectively, the wet section 58 comprises an endless conveyor generally designated by the reference character 190 defined by a plurality of individual, independent and separate endless conveyor elements 192. These elements may be fabricated of any suitable material, and for example, may be fabricated of an elastomeric substance, such as neoprene rubber. The elements 192 are annular or circular in cross-section, as clearly illustrated in FIGS. 9, 10 and 11. Accordingly, not only do they conform to the configuration of the grooves 188 in the periphery of the drive shaft 130, but due to the difference of substances, the friction therebetween as the drive shaft is driven will in turn cause the endless conveyor elements 192 to be driven. It is considered readily apparent that the conveyor elements 192 extend between and completely about the driven shaft 132 as well, and accordingly the latter also comprises a corresponding number of grooves 194 in its periphery. The conveyor elements 192 will drive the driven shaft 132 due to the friction between these elements and the driven shaft. It will now be understood that as each infinitesimal succeeding portion or segment of the surface of the grooves 188 passes the projections 186 of the scraper element 182, the latter will remove and scrape any confection or icing that has been deposited directly thereupon, or upon the endless conveyor elements 192, from whence the icing has fallen upon the drive shaft 130. It will now be understood that the mounting bars 180 and 184 and the scraper element 182, taken in conjunction, comprise a first scraping assembly which may generally be designated by the reference character 196.

The removable wet section 58 comprises a second scraping assembly generally designated by the reference character 198. In addition to being constructed and arranged to scrape and remove the confection or icing that has fallen upon the driven shaft 132, the scraping assembly 198 is constructed and arranged to remove and scrape confection or icing that has been deposited upon the individual conveyor elements 192. To this end, the assembly 198 comprises an L-shaped mounting bar 200 having a horizontal leg 202 that extends between the mounting bosses 174 and 178, and is affixed thereto in any suitable manner, such as through the medium of suitable fasteners (not shown). A scraper element 204, which is of the same construction as the scraper element 182, may be fabricated of the same material, and comprises projections or scraping projections 206, is adapted to be removably mounted upon the leg 282 through the medium of another mounting bar 206. The mounting bar 206 is adapted to removably cooperate with the leg 282, such as through the medium of suitable fasteners (also not shown). The mounting bar 200 comprises a vertical leg 208 having apertures 210 therein that correspond in number with the number of individual conveyor elements 192. A scraper element 212 is adapted to be removably mounted upon the vertical leg 208, in any suitable manner, such as through the medium of fasteners 214. The scraper element or plate 212 comprises a plurality of grooves or recesses 216 through which the conveyor elements 192 are adapted to pass. Accordingly, the number of recesses or grooves 216 correspond in number with the number of apertures 210, and in addition, are disposed in alignment therewith.

The removable wet section 58 comprises, still further, removable transfer rods 218 which extend between the vertical side legs 162 and 164. One such transfer rod is located adjacent the drive shaft 130, and another rod adjacent the driven shaft 132. The transfer rods 218 are adapted to be snapped into position, and accordingly are fabricated of a material that allows a sufficient degree of flexure thereof. The side legs 162 and 164 are provided with aligned apertures (not shown) for this purpose. These rods perform the function of facilitating the transfer of the edible products from the infeed section 56 of the removable wet section 58, and from the latter section to the outfeed section 60, respectively.

With particular reference now to FIGS. 4, 5 and 6, a confection or icing expressing and depositing assembly, generally designated by the reference character 220 is adapted to be positioned upon the conveyor table 42. The confection depositing and expressing assembly 220 comprises a frame or table 222 which, in turn, comprises a platform 224 positioned or mounted upon four vertically adjustable legs 226. The legs, which are threaded at their upper and lower ends, as indicated partially in FIG. 6, threadably cooperate with bearing blocks 228 of L-shaped configuration. The blocks 228 are adapted to be positioned upon the standards 50 and 52, and extend inwardly thereof towards one another, with each horizontal set being disposed in alignment, for a purpose presently to be described. The platform 224 is positioned upon another set of bearing blocks 230, one each being vertically adjustably mounted at the upper end of the corresponding one of the legs 226, in any suitable manner, as through the medium of fasteners or bolts 232.

A scale 234 extends along the infeed section 56 adjacent each of the standards 50 and 52. Each of the scales are of L-shaped configuration having a horizontal leg 236 and a vertical leg 238. The horizontal legs 236 are fixedly positioned upon the bearing blocks 228, as for example, through the medium of suitable fasteners 240. Though not shown, it will be understood that the scale will be provided with suitable indicia markings, such as the markings that may be found on a 12-inch ruler.

A signal receiving-and-sending assembly, generally designated by the reference character 242 is adapted to be adjustably positioned relative to the scales 234. As particularly illustrated in FIG. 12, this assembly comprises a sensing device or receiver 244, and a source of light 246 adapted to transmit a beam of light thereto. The light source and sensing or receiving device 246 and 244, respectively, may be of any suitable and conventional construction, whereby the beam of light transmitted to the sensor illuminates it, thus generating and transmitting an impulse or signal to a conventional photo electric cell (not shown) that is positioned within a control box or panel 248. The photoelectric cell is, in a conventional manner, adapted to close or open a circuit (hereinafter to be described in greater detail) depending upon whether the sensor 244 is illuminated by the beam of light generated by the source 246, or the beam of light is interrupted. The source of light 246 and the sensor 244 are each fixedly mounted or positioned upon brackets 250 of U-shaped construction. The brackets 250, in turn, are adapted to be adjustably fixedly mounted or positioned upon the scales 234, and more particularly, upon the vertical leg 238 thereof. To this end, the brackets 250 each comprise threaded wing nuts 252. It will now be understood that the scales 234 perform, among others, the function of insuring that the light source 246 and the sensor 244 are disposed in exact horizontal alignment with one another. The significance of this is considered readily apparent. In addition, it will be understood that the position of the source and sensor is critical in relation to the location and point of time when the confection expressing and depositing assembly 220 actually begins to dress the edible products translated by the conveyor table 42 in the desired predetermined pattern. As an example only, and not by way of limitation, and assuming that the edible product to be dressed is contained within an annular pan, it may be desirable to initiate the dressing of the product as soon as the edge of the pan is in vertical alignment with the forward edge of the removable wet section 58. Taking into consideration that the confection or icing is of a semi-fluid consistency, and that the viscosity of the confection may vary from day to day, it will be necessary to position the source 246 and the sensor 244 along the infeed section 56 adjacent to the wet section. In effect, it can be said that the signal-receiving-and-sending assembly 242 must be positioned to "lead" the confection or icing to be expressed and deposited upon the edible products. The exact position of the assembly 242 along the infeed section will be predetermined, depending upon the aforesaid conditions, and adjusted with precision through the medium of scales 234. The position of the assembly 242 will also be proportionate to the speed of the conveyor table 42. The type of confection or icing and its flow rate are additional conditions of the utmost importance.

The scales 234 further comprise guiding fingers pivotally mounted upon the horizontal legs 236 thereof. The guide fingers 254 perform the function, among others, of centering the edible products as they enter upon the infeed section 56, thus insuring that the products will be centered as they approach and enter upon the removable wet section 58, at which location these products are dressed with the desired confection or icing.

It will be understood that the present invention encompasses within the scope thereof the concept of constructing the conveyor table and the confection or icing expressing and depositing assembly 220 to dress a plurality of rows of edible products. Accordingly, the illustration and description of only a single row of products being dressed is intended by way of example only, and is not in any way intended to be limiting.

The frame 222 comprises, as hereinbefore pointed out, a platform 224 which is positioned and rests upon the bearing blocks 230. The platform 224 is an integrally cast unit comprising side braces 260, and end braces 262. A plurality of lateral struts 264 for stabilizing the platform 224 extends laterally thereacross between the side braces 260. In order to facilitate an understanding of this invention, the end brace 262 adjacent the removable wet section 58 will hereinafter be referred to as the front brace of the platform. A conventional icing expressing and depositing head, generally designated by the reference character 266, is adapted to be removably mounted relative to the frame 222, and more particularly, with respect to the platform 224 thereof.

As clearly shown in FIG. 5, the confection or icing expressing and depositing head, which hereinafter will be referred to as an "icing head," will be seen to comprise an upper portion or mounting block 268 responsible for removably positioning the head 266 relative to the platform 224. To this end, and with particular reference now to FIG. 13, it will be seen that the mounting block 268 of the icing head 266 comprises an inlet boss 270 with respect to which an inlet conduit 272 for the confection or icing is adapted to be fixedly connected. The block 268 further comprises an outlet boss 274 relative to which an outlet conduit 276 is adapted to be operatively connected. The block 268 is cast to define an inlet chamber 278 for the confection or icing, and an outlet chamber 280 therefor. Additionally, the block is constructed to define a transfer chamber 282 across which the confection or icing is translated under pressure from a source hereinafter to be described. As particularly illustrated in FIGS. 13 and 14, the transfer chamber 282 extends substantially completely of the mounting block 268. Its breadth, however, is only approximately one-half of the block, while the same dimension of the inlet and outlet chambers 278 and 280 respectively are substantially equal thereto.

A bolt 284 extends through the wall of the block at the inlet chamber 278, and a similar bolt 286 extends through the same wall at the outlet chamber 280. With continued reference now to FIG. 5, it will be seen that the platform 224 comprises a plurality of mounting bars 288 affixed to the forward brace 262 and one of the lateral struts 264. Each of the mounting bars 288 comprise a bifurcated end 290 with which the bolts 284 and 286 are particularly adapted to cooperate in any suitable manner, as through the medium of suitable fasteners or bolts 292. Additionally, the block 268 comprises a plurality of transverse bores 294 adapted to be disposed in alignment with apertures extending in the same direction through the forward brace 262. The mounting block 268, therefore, is equally adapted to be affixed to the forward brace 262 in a horizontal direction as well, as through the medium of suitable fasteners 296. The icing head 266 comprises, further, a lower portion or block, generally designated by the reference character 298, which hereinafter will be referred to as the expressing and depositing or icing block. This block is adapted to be removably affixed relative to the mounting block 268, and to this end, the mounting block comprises two rows each of a plurality of vertical bores 300 extending therethrough. As clearly illustrated in FIG. 18, the icing block 298 itself comprises vertical bores 302 which correspond in number and are vertically aligned with the bores 300 extending through the block 268. The bolts 304 (see FIG. 5) that are threaded at each end thereof are adapted to be removably fixedly positioned within the bores 302 which, as clearly illustrated in FIG. 19, only extend partially into the icing block 298. When the block 298 is to be mounted upon the block 268, it is simply necessary to place them together in such a position enabling the bolts to extend through the vertical bores 300 in the mounting block and emerge from the top thereof, as clearly shown in FIG. 5. Suitable fasteners 306, such as wing nuts, are adapted to cooperate with the threaded upper end of each of the bolts 304. It will now be understood that removal of the icing block 298 from the mounting block 268 can be accomplished with the same facility.

With particular reference now to FIG. 18 through 23 inclusive, the icing block 298 will be seen to comprise an expressing and depositing portion generally designated by the reference character 308, and an actuating portion generally designated by the reference character 310. The expressing and depositing portion 308 is integrally cast to define an expressing chamber 312, the depth of which is substantially the same as that of the portion 308. The chamber 312 is counterbored along what may be denoted as a leading edge 214 thereof (since the leading edge of the pan within which the edible products are contained pass this edge first), to define a shelf 316 extending completely of the length of the expressing chamber. The shelf 316 is constructed to define a substantial plurality of grooves 318 of semi-annular configuration. An aperture 320 extends from the bottom of each groove 318 through the shelf 316 and provides egress from the expressing chamber 312. The expressing and depositing portion comprises an undersurface 322 having a recess 324 of generally trapezoidal configuration to define an expressing and depositing area at which the apertures 320 exit from the chamber 312. The other edge or wall 326 of the chamber 312 is counterbored to provide a groove 328 extending completely of the length of the chamber 312 for a purpose hereinafter to be described.

The expressing and depositing portion of the block 298 comprises, further, a plurality of bores 330 that correspond in number and are disposed in alignment with the grooves 318. The bores extend from the edge 314 completely through the portion 308 within each of which a slidable plunger 332 is adapted to be disposed. The length of each plunger 332 is such that it can be positioned to bear against the groove 328 extending along the wall 326, extend through the portion 308, exit therefrom, and then extend through the portion 310, as clearly illustrated in FIG. 21.

Figure 22:
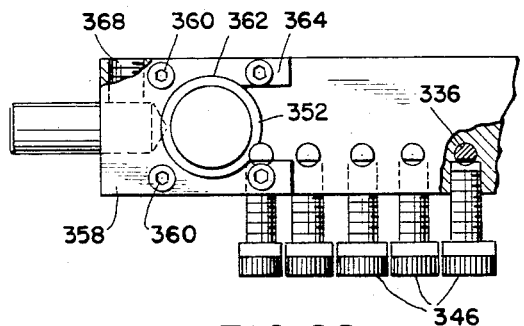
FIG. 22 is a cross-sectional view taken along the line 22—22 of FIG. 18.
Figure 23:
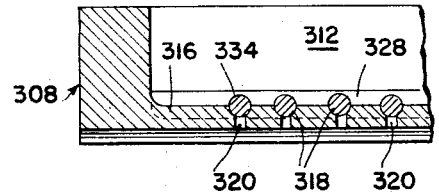
FIG. 23 is a cross-sectional view taken along the line 23—23 of FIG. 18.

With continued reference to that figure, it will be seen that the plungers 332, in elevation, comprise a control portion 334 and a locating portion 336. The control portion 334, in cross-section, is of annular or circular configuration, as illustrated in FIG. 23, while the locating or positioning portion 336, in cross-section, is of semi-annular or circular configuration, as shown in FIG. 22. It is considered readily apparent that the plungers 332 are adapted to be reciprocated relative to the apertures 320 to open and close them, thus enabling the confection or icing to be expressed and deposited upon the edible products translated beneath the icing head by the conveyor table 42. It is necessary, therefore, that provision be made for lubricating the plungers 332, and to this end, the portion 308 comprises a plurality of lubricating apertures 338 that correspond in number with the number of plungers. The apertures 338 extend upwardly from a corresponding one of the bores 330 and exit into a groove 340 that extends completely of the length of all of the apertures 338 when taken in conjunction with one another, as clearly illustrated in FIG. 18. A suitable lubricating fluid is adapted to enter the groove 340, and then enter into the apertures 338 to properly lubricate the plungers 332.

As hereinbefore pointed out, the plungers 332 are particularly adapted to be reciprocated within their corresponding bores 330 relative to the apertures 320. The actuating portion 310, which is adapted to perform this function, thus comprises a block 342 having an aperture 344 for each of the plungers 332. The positioning, locating or flat portion 336 of the plungers extends through a corresponding one of the bores 344, and is adapted to be adjustably fixed in position with respect thereto in any suitable manner, as through the medium of suitable set-screws 346. A plurality of guiding rods 348 are fixedly positioned relative to the portion 308, and to this end, the latter is provided with a corresponding number of bores 350 for receiving suitable fasteners, such as set-screws (not shown). The block 342 is particularly adapted to be reciprocally movable relative to the rods 348, and to this end, comprises a Teflon bearing sleeve 352 having a collar 354 of annular configuration. The Teflon sleeves 352 are positioned within bores 356 that extend through the block 342 at either end thereof. A clamping collar 358 for retaining the sleeves 352 in position relative to the block 342 by bearing against the collar 354 is adapted to be fixedly positioned upon the block in any suitable manner, as through the medium of suitable fasteners 360. The clamping collar 358 is bifurcated to define an annular recess 362 that fits around the sleeve 352. The legs 364 of the bifurcated end of the collar 358, as is now considered readily apparent, bear against the collar 354 of the sleeve, to thus retain it in position relative to the guiding rods 348.

The block 342 of the actuating portion 310 comprises, still further, a plurality of actuating rods 366 extending laterally outwardly from each end thereof. The rods 366 are adapted to be fixed in position relative to the block 342, and to this end, the latter is provided with bores 368 in which set-screws, for example (not shown), are particularly adapted to be threadably engaged.

Figure 18:
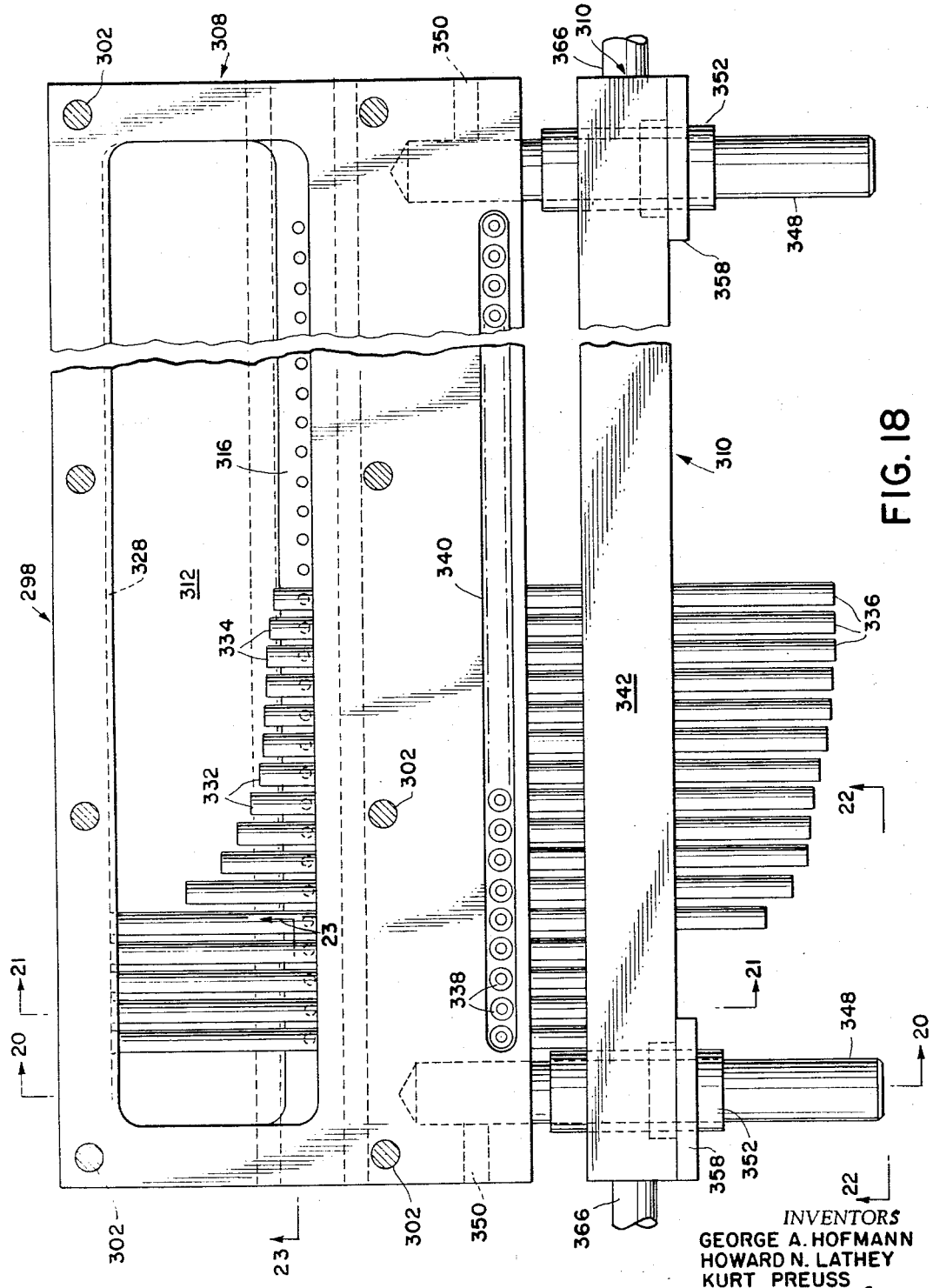
FIG. 18 is a plan view of the icing portion of the confection or icing expressing and depositing head.
Figure 19:
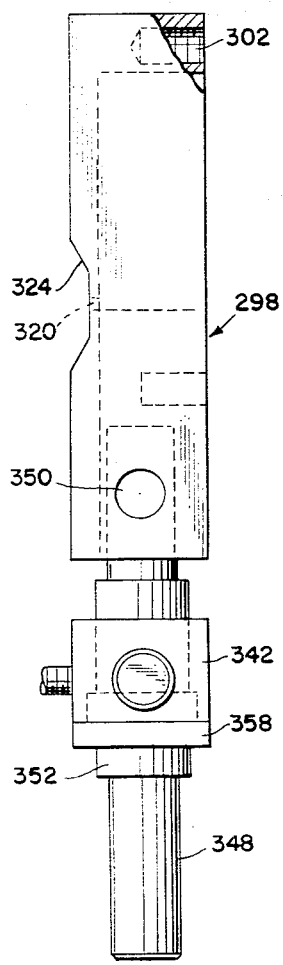
FIG. 19 is a side elevational view looking in a direction towards the right of FIG. 18.
Figure 20:
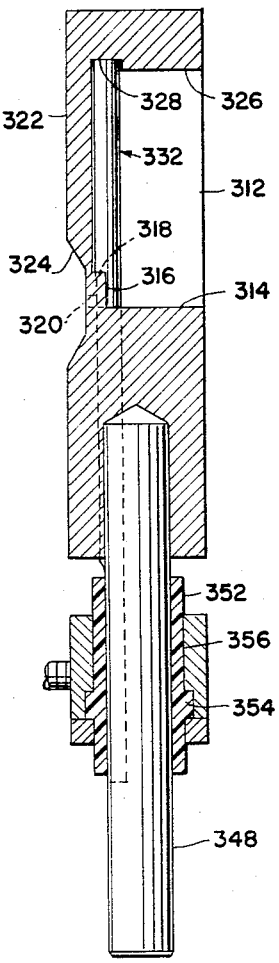
FIG. 20 is a cross-sectional view taken along the line 20—20 of FIG. 18.
Figure 21:
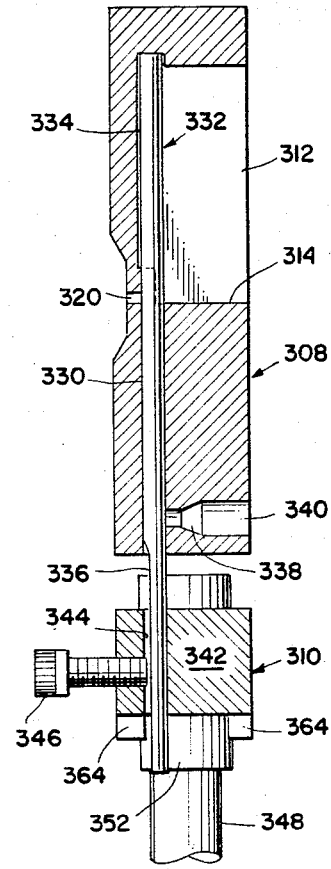
FIG. 21 is a cross-sectional view taken along the line 21—21 of FIG. 18.

With continued reference to FIG. 18, the plungers 332 are illustrated therein as being disposed or positioned in accordance with a particular pattern. The pattern defined by the position of the plungers 332, as shown in FIG. 18, is intended by way of example, and not in any way intended to be limiting. This particular pattern, as is now considered readily apparent, substantially conforms with the contour or configuration of an annular or circular pan in which the edible products translated by the conveyor table 42 are contained. Thus, upon actuation of the portion 310, in a manner hereinafter to be described, it will be pulled, moved or translated away from the portion 308, thus causing a similar translation or movement of the plungers 332. In accordance with the pattern in which the plungers are disposed, the first aperture 320 to be exposed or opened by the plungers will be the one disposed generally centrally of the length of the expressing chamber 312. The next two apertures to be exposed will be those controlled by the plungers 332 to each side of the center plunger. This procedure will continue until enough apertures are exposed to express and deposit confection or icing on the edible products in the desired predetermined pattern completely across its diameter. The plungers 332 which are located outwardly of the diameter of the edible products are initially disposed to abut against the wall of the groove 328 so that the apertures controlled thereby will not be exposed to preclude wasting the confection or icing.

Figures 24, 25:
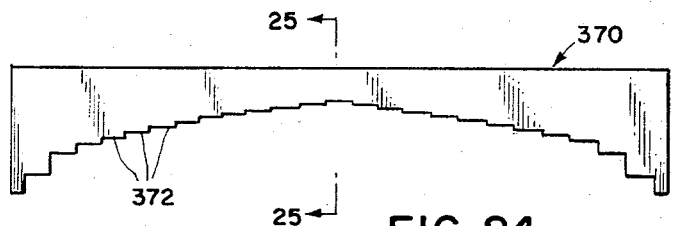
FIGS. 24 and 25 are a plan view, and a central cross-sectional view, respectively, illustrating a means for adjusting the confection or icing expressing and depositing head to enable it to dress the edible products in accordance with an exemplary desired predetermined pattern.
Figure 26:
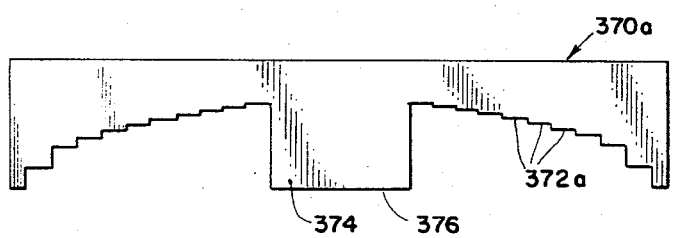
FIG. 26 is a view similar to FIG. 24, illustrating a plate enabling the head to dress the products with another exemplary pattern.

It is of course desirable that the plungers 332 be capable of being disposed in a position to accurately and substantially exactly conform with the contour or configuration and dimensions of the pans in which the edible products are contained. To this end, and with particular reference now to FIGS. 24 to 26, pattern plates 370 are provided which are contoured, configured, dimensioned and arranged to conform with the same criteria of the pans in which the edible products are contained. For example, it is the pattern plate 370 shown in FIG. 24 that is responsible for disposing the plungers 332 in the position clearly illustrated in FIG. 18. The length of the pattern plate 370 is substantially the same as the distance between the clamping collars 358. In use, the plate 370 is positioned between these collars, in abutment with the block 342. The set-screws 346 are released, and then pushed or pulled until each one abuts against a corresponding one of the shelves 372 with which the pattern plate 370 is provided. It is considered readily apparent that the shelves 372 at either end of the plate are responsible for positioning the corresponding plungers 332 in abutment with the wall of the groove 328. The shelf 372 located centrally of the plate 370 is responsible for positioning the corresponding plunger so that it will expose its aperture 320 soon after the portion 310 is actuated. The shelves 372 to either side of the middle shelf will cause the plungers 332 to either side of the middle plunger to expose their corresponding apertures (to either side of the middle aperture 320) to be exposed shortly after the middle aperture is opened. As pointed out above, the pattern plate 370 is exemplary only and is contoured, configured, dimensioned and arranged to conform with one annular or circular pan or container for the edible products. As shown in FIG. 26, wherein like reference characters indicate like parts, but wherein the reference characters are followed by the subscript "a," pattern plate 370a is contoured, configured, dimensioned and arranged to conform with a similar type of pan or container, but comprises a projection 374 of substantial width so that the predetermined design of confection or icing expressed and deposited upon the edible products will be defined by strips of icing to either side of this projection. There will accordingly be no icing on the edible products along the middle thereof along their direction of travel by the conveyor table 42. The pattern plates are therefore not only responsible for insuring that the predetermined design of the confection or icing upon the edible products conforms with the contour of their pans or containers, but are also responsible for the design of the icing that actually appears thereupon. In this connection, in the example shown in FIG. 26, the depth of the projection 374 is substantially the same as the same dimension of the pattern plate 370a at either end thereof. Accordingly, the corresponding plungers 332 will be disposed in abutment with the wall of the groove 328. If it is desired to express and deposit the confection or icing so that the resulting design thereof will incorporate, in effect, a hole in the middle of the edible products, the projection 374 can be constructed so that the edge 376 thereof is of semi-annular configuration.

With continued reference now to FIGS. 4, 5 and 12, and in addition with reference to FIG. 27, a driving assembly generally designated by the reference character 380 is mounted upon the platform 224 of the frame 222. The driving assembly 380 comprises a variable speed motor 382 which is vertically adjustably positioned relative to a frame 384 (which may be denoted as a driving assembly frame) in a manner hereinafter to be described. The motor 382 comprises an output shaft 384 having a drive pulley 386 non-rotatably positioned thereupon. A driven pulley 390 is non-rotatably mounted upon the input shaft (not shown) to a transmission or reduction differential gear 392. An endless drive belt 394 extends between and completely about the drive pulley 386 and the driven pulley 390 for transmitting the driving force of the variable speed motor 382 therebetween. The transmission 392 comprises an output shaft 396 on which a secondary drive pulley 398 is non-rotatably mounted. An endless drive chain 400 of the link-type extends about the drive pulley 398, and between that pulley and a secondary driven pulley 402 having a pulley wheel 404 non-rotatably affixed thereto. The wheel 404 has teeth 406 extending about the periphery thereof for engagement with the secondary endless driving belt 400.

The drive assembly 380, once it is turned on, is continuously operable. However, the edible products are only intermittently translated beneath the icing head 266. Accordingly, it is desirable that the motion transmitted from the drive assembly 380 to the actuating portion 310 of the icing head be translated from one of continuous operation to one of intermittent operation. To this end, a single-revolution clutch assembly 408, which may be of any suitable and conventional construction is adapted to be operatively associated with the secondary or auxiliary driven pulley 402 which is continuously operable by the motor 382 in the manner hereinbefore described. The clutch assembly 408, which may be of any suitable and conventional construction as just pointed out, is adapted to be engaged and disengaged from a relationship in which it is rotatably associated with the auxiliary driven pulley 402. The latter is rotatably mounted upon a shaft 410 which extends laterally of the platform 224 towards the rear thereof. The shaft 410 is rotatably journalled upon and with respect to the platform in any suitable manner, as through the medium of suitable journal bearing assemblies 412 having bearing sleeves 414 through which the shaft extends.

The single-revolution clutch assembly 408 is non-rotatably mounted upon the shaft 410 in any suitable manner. Accordingly, when the clutch assembly is engaged with the secondary driven pulley 402, the former will cause the rotation of the shaft 410. However, when the clutch assembly is disengaged from the pulley 402, the shaft 410 will not rotate. To this end, the clutch assembly 408 comprises an abutment or stop pin 416 extending axially outwardly of the clutch assembly 408 in eccentric relationship with respect to the shaft 410 and a reduced diameter portion 418 thereof. The clutch assembly, which may be of any suitable and conventional construction, as hereinbefore pointed out, preferably is constructed and arranged to inherently tend to be disposed in engagement with the auxiliary driven pulley 402, that is, in non-rotatable relationship therewith. The clutch assembly, therefore, inherently tends to cause the rotation of the shaft 410. However, when the abutment or stop pin 416 is engaged, in a manner presently to be described, the clutch assembly will be disengaged from the pulley 402, and the shaft 410 will stop rotating. To this end, the driving assembly 380 comprises, still further, a solenoid 420 which may be of any suitable and conventional construction. The solenoid comprises an actuator shaft 422 having an actuating link 424 pivotally connected thereto. The link 424 is pivotally connected to a brake, abutment or stop link 426 which extends upwardly from the platform 224. The stop link 426 is pivotally connected to the platform 224 through the medium of a pivot pin 428 that is operatively related to a mounting ear 430. A standard 432 extends upwardly from the platform 224. A biasing element or spring 434 is connected to and extends between the stop link 426 and the standard 432. Accordingly, the stop link 426 will be normally biased to a position in which it tends to engage the stop pin 416. The solenoid 420 preferably is constructed to normally be disposed in a de-energized condition. Upon the energization thereof, the actuating shaft 422 will be drawn inwardly thereof, and the brake 426 will be pivoted out of the path of travel of the pin 416 through the medium of the connecting link 424. The clutch assembly 408 will then be released into engagement with the auxiliary driven pulley 402, so that the pulley can drive the clutch assembly. The clutch assembly can then, in turn, drive the shaft 410. Since the solenoid tends to normally be disposed in a de-energized condition, it will return to that condition substantially immediately after it has been energized. Accordingly, the link 426, under the influence of the biasing element 434, will return to the position illustrated in FIG. 28 in which it is disposed in the path of travel of the pin 416. Thus, the clutch assembly 408 will be capable of only a single revolution each time the solenoid is energized.

The driving assembly 380 comprises, still further, a cam wheel 436 which is adapted to be driven by the shaft 410. To this end, the wheel 436 comprises a bearing 438 to which the shaft extends, and with respect to which it is non-rotatably journalled in any suitable manner. A set-point link 440 is pivotally connected to the platform 224 through the medium of a pivot pin 442 and a mounting ear 444 extending upwardly from the platform, as clearly illustrated in FIG. 4. The set-point link comprises a set-point pin 446 which extends laterally outwardly thereof. As pointed out above, the periphery of the cam wheel 436 is of irregular configuration, and comprises a set-point recess 448. The set-point pin 446 is adapted to be disposed in the recess 448 to define the exact point in time at which the drive assembly will cause the actuation of the actuating portion 310 of the icing head 266. In this connection, the set-point link 440 is biased in the direction towards the cam wheel 436 by a biasing element or spring 450 extending from the end of the link opposite the pivot pin 442 to the platform 224. Accordingly, the pin 446 will be biased into engagement within the recess 448 of the wheel 436. Of course, since the shaft 410 is capable of only a single revolution for each energization of the solenoid 420, due to the construction of the clutch assembly 408, the wheel 436 will also revolve through only a single revolution. However, it is desirable that each revolution of the wheel begin and end at exactly the same location. Thus the reason for the link 440 and the pin 446 which, as hereinbefore pointed out, defines the exact location at which the wheel begins each revolution.

The drive assembly 380 comprises, still further, an actuating linkage assembly generally designated by the reference character 452. This assembly comprises a first link 454 having a first portion 456 pivotally connected to the cam wheel 436 through the medium of a pivot pin 458. The link 454 further comprises a second portion 460. The first and second portions 456 and 460 respectively are adjustable longitudinally relative to one another through the medium of an adjusting link 462 having slots (not shown) relative to which fasteners 464 are operatively associated. The actuating assembly 452 comprises a second actuating link 466 which is pivotally connected to the first actuating link 454 by a pivot pin 468. The second link 466 is non-rotatably positioned upon a shaft 470 which extends laterally across the platform 224. The link 466 has a bifurcated end 472 which cooperates with one of the actuating pins 366 of the actuating portion 310 of the icing head 266. A link 474 is non-rotatably mounted upon the shaft 470 at the other end thereof, and comprises a bifurcated end 476 for engagement with the other actuating pin 366 at the opposite end of the actuating portion 310. The link 474 is of similar construction as the link 466, though the latter is of greater length than the former.

As pointed out above, the motor 382 is mounted on a frame. This frame is constructed and arranged to enable the motor to be vertically adjustable relative thereto. In turn, this enables the rotational velocity of the shaft 410 of the drive assembly 380 to be varied. This is true, since by lowering the motor the distance between the drive pulley 386 and driven pulley 390 is decreased. By raising the motor, the distance is increased. By decreasing the distance between the pulleys, the rotational velocity of a point on the belt 394 relative to the periphery of the driven pulley 390 will increase, so that in turn the rotational velocity of this pulley will increase. By the same token, as the distance between the pulleys is decreased, the rotational velocity of a point on the belt 394 relative to the periphery of the driven pulley will decrease, so that the rotational velocity of a point on the periphery of the driven pulley will similarly decrease. To this end, the frame 384 for the motor comprises a U-shaped bracket 385 having a plurality of legs 387, each of which in turn is constructed and arranged to define a base 389. A wall 391 extends between the bases 389, and is fixedly positioned upon the platform 224. The bracket 385 comprises a bight 393 having a plurality of mounting bosses 395 extending therefrom. A plurality of guide rods 397 extend between the mounting bosses 395. A driving rod 480 also extends between the mounting bosses 395, and comprises screw threads 482. A plurality of adjustable brackets 484, upon which the motor 382 is bolted as through the medium of suitable fasteners 486, are particularly adapted to vertically reciprocate along the driving rod 480. To this end, the brackets 484 each have a screw threaded aperture (not shown) through which the driving rod 480 extends. The brackets 484 are adapted to be guided as they are vertically reciprocated along the driving rod 480 by the guide rods 397. The driving rod 480 comprises, further, a driving wheel 488 having a handle 490. It will now be understood that as the driving wheel 488 is rotated, the rotation of the driving rod 480 will cause the brackets, and thus the motor 382, to reciprocate relative thereto.

Figure 30:
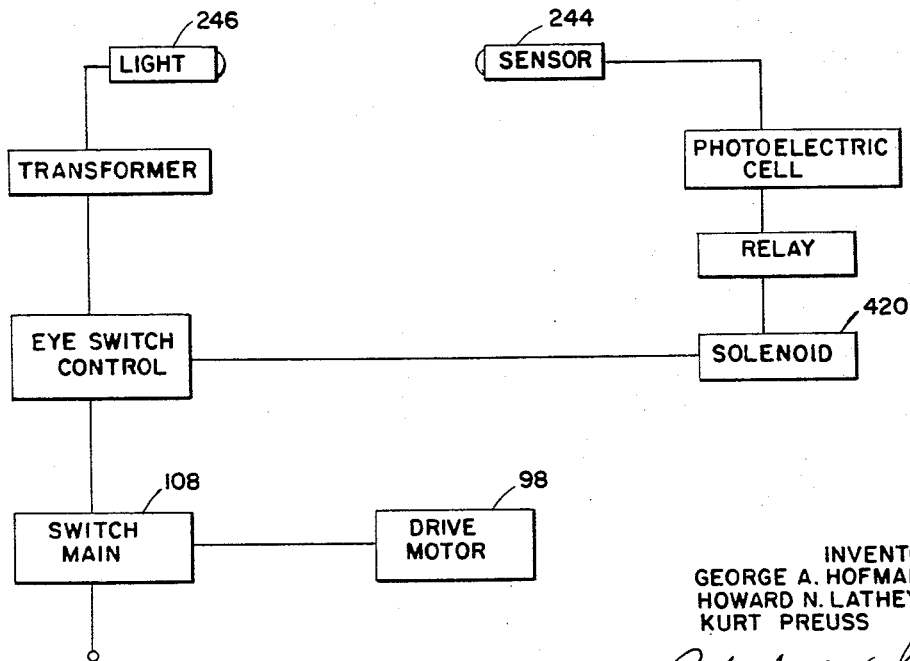
FIG. 30 is schematic wiring diagram.
Figure 34:
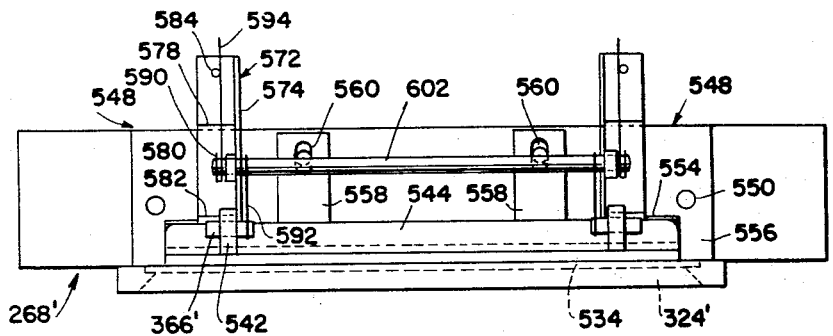
FIG. 34 is a front elevational view of the modification shown in FIG. 32.
Figure 35:
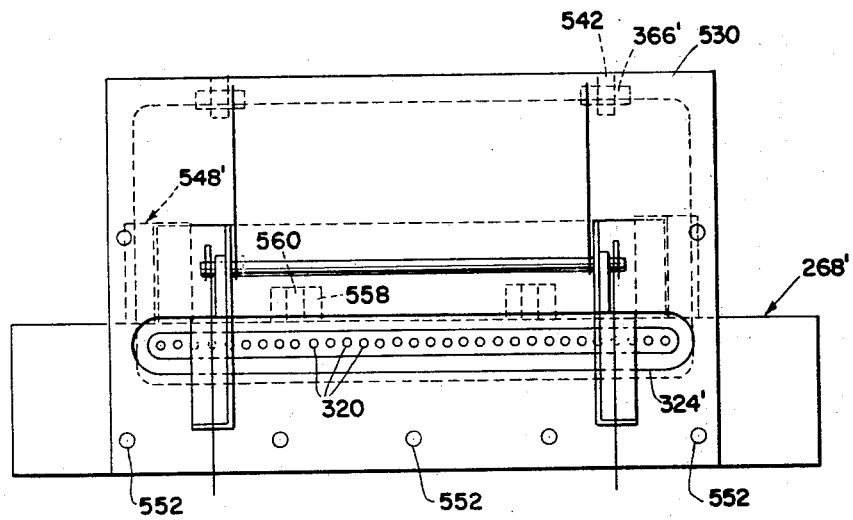
FIG. 35 is a bottom plan view of the modification shown in FIG. 32.
Figure 36:
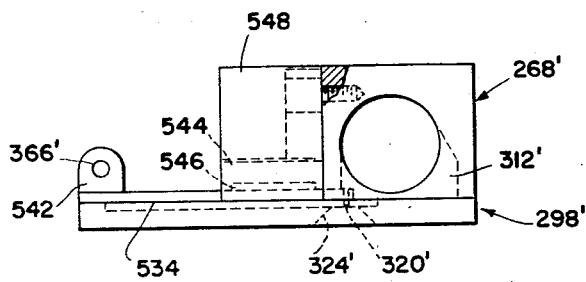
FIG. 36 is a side elevational view of the modification shown in FIG. 32.

In the operation of the present invention, when the motor 98 is turned on in the manner hereinbefore described, the conveyor table 42 will translate the edible products on which confection or icing is to be expressed and deposited therealong. The edible products first enter upon the infeed section 56, which will translate them towards the wet section 58. As the edible products approach the wet section, the leading edge of the pan in which they are contained will interrupt the beam of light transmitted by the source 246 to the sensor 244. This signal, that is, interruption of the beam of light, is transmitted to a photoelectric cell which, as hereinbefore pointed out, may be of any suitable and conventional construction. This cell, clearly illustrated in the schematic wiring diagram of FIG. 30, then transmits a signal, through the medium of any suitable and conventional relay, to close a circuit to the solenoid 420. The solenoid will thus be energized, and the sequence of operations hereinbefore described will take place. More particularly, the actuating linkage assembly 452, through the medium of the cam wheel 436, will cause the actuating portion 310 of the icing head 266 to be drawn away from the expressing and depositing portion 308. The aperture 320 will then sequentially be exposed so that the edible products being translated beneath the icing head will have expressed and deposited thereupon the confection or icing in the desired predetermined pattern. It is to be understood that the time delay between the sensor 244 receiving a signal and the actuation of the actuating portion 310 to expose the apertures 320 is quite short. As pointed out hereinbefore the light source 246 and the sensor 244 are located forwardly of the leading edge of the wet section 58 to take into account this time delay so that the confection or icing begins to dress the edible product exactly along its leading edge. To insure complete accuracy, it is to be understood that the distance between the portions 308 and 310 of the icing head 298 defines a "gap setting" which is indicated on all icing heads by suitable indicia. This distance insures that the correct position of the actuating portion relative to the expressing and depositing portion is maintained. In turn, accurate control of the plungers 332 relative to the apertures 320 through which the confection or icing is expressed and deposited is maintained. The importance of this "gap setting" will be appreciated when it is realized that the travel of the plungers 332 is not adjustable during the operation of the apparatus 40. Accordingly, in the event that the "gap setting" is not indicated on each icing head, and is not set before the apparatus begins to operate, the plungers 332 may jam at the end of the stroke, or there may be leakage at the beginning of the stroke.

As is now considered readily apparent, the photoelectric cell, the relay, and the other necessary components, parts or elements required for the drive assembly 380, such as a transformer and eye switch control, are positioned within the auxiliary control box or panel 248. The primary or main control box or panel 108 controls the supply of energy to the motor 98, as well as to the circuit in which the drive assembly 380 is disposed. Unless the on-off switch at the main control box or panel 108 is turned on, the circuit in which the drive assembly is disposed cannot be energized. However, once the main switch is turned on, the latter circuit can also be energized, as through the medium of suitable on-off switches 492.

Figure 31:
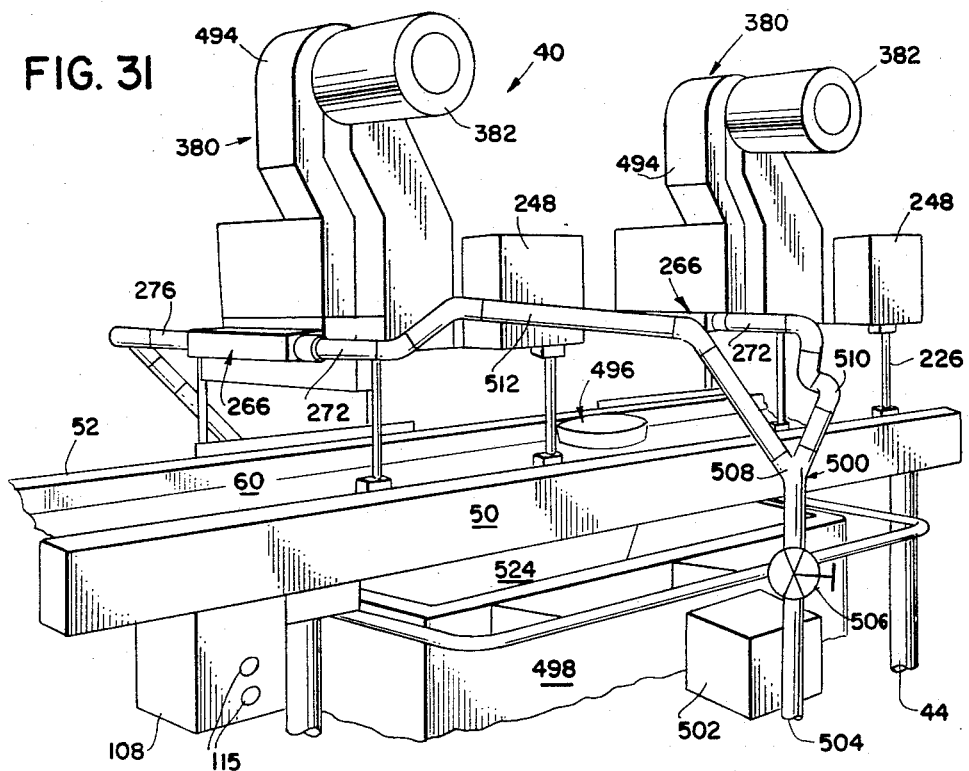
FIG. 31 is an isometric view illustrating an installation of a plurality of confection or icing expressing and depositing assemblies constructed in accordance herewith.

With particular reference now to FIG. 31, there is schematically illustrated therein a complete installation of the present invention. The drive assembly 380 is completely positioned within and enclosed by a suitable housing 494 to protect the components, elements and parts thereof.

The confection or icing to be expressed and deposited upon the edible products, one of which is generally designated in this figure by the reference character 496, is supplied to the icing heads 266 by an icing tank or container 498. The tank or container may be of any suitable and conventional construction, and generally comprises a heating unit for heating the confection or icing, and a pump (both of which are not shown). The tank or container 498 is constructed and arranged to recirculate the confection or icing, and to this end, a system of conduits generally designated by the reference character 500 is provided. The degree of thermal energy applied to the confection or icing, and the pump for recirculating it, are controlled from a panel 502. The system of conduits, or conduit assembly 500, comprises an outlet 504 into which the icing is conveyed. A control valve 506 which may be of any suitable and conventional construction is disposed in the conduit 504. This conduit conveys the icing into a Y 508, which divides the flow of icing and conveys it to two different paths. In the exemplary installation illustrated in FIG. 31, two expressing and depositing assemblies 266 and drive assemblies 380 are illustrated. This installation is particularly designed for dressing the edible products 496 with what may be denoted as a criss-cross pattern of confection or icing. Accordingly, after the edible product has been dressed in one direction, it is turned through an angle of 90° to dress it in another direction. An assembly (not shown) for so turning the edible products is mounted upon one or the other of the standards 50 or 52. Accordingly, one path through which the icing is conveyed from the Y 508 is defined by a conduit 510, and another path defined by a conduit 512. Each of these conduits are operatively connected to the assemblies 266 as through the medium of suitable couplings 514. The confection or icing, after it passes through the assemblies 266, exists therefrom through the outlet conduits 276. A T-shaped coupling 516 (see FIG. 5) is operatively connected to the outlet conduits 276 through suitable couplings 518, and to return conduits 520 through suitable couplings 522. The icing tank 498 comprises a sump 524 into which the icing that is not used is drained. The icing is then recirculated by the pump of the icing tank 498.

It will of course be understood that the installation illustrated in FIG. 31 is intended by way of example only. If it is desired to dress the edible products 496 in only one direction, then of course only a single installation will be utilized, rather than the plural installation shown therein.

It will be understood that the amount of confection or icing that is actually expressed and deposited upon the edible products 496 will depend upon, in addition to other factors, the type of pattern desired and the speed with which the edible products are translated by the conveyor table 42. It is therefore necessary to provide a release valve to insure that the pressure in the system of conduits 500 through which the confection or icing is conveyed does not become excessive. Accordingly, a release valve 526 which may be of any suitable and conventional construction is operatively associated with the T-shaped coupling 516.

The frame 222 is mounted on four vertically adjustable legs 226, as hereinbefore pointed out. Accordingly, the frame, and the confection or icing expressing and depositing assembly 266, is vertically adjustable. The ability of the assembly 266, and the icing head 298 thereof, to be vertically adjustable closer to and further away from the edible products 496 to be dressed with the confection or icing is important, since the shape of the predetermined designed or pattern of the icing can therefore be varied. This is true because the confection or icing is of semi-fluid consistency. If the icing head 298 through the medium of the frame 222 is positioned closer to the edible products, the confection or icing will curl. Each strip of icing will thus present a curlicue configuration. However, as the icing head through the medium of the frame 222 is vertically adjusted further away from the edible products, each strip of confection or icing to be dressed thereupon will approach a more linear configuration.

It is a critical aspect of the present invention that the predetermined design or pattern of the confection or icing begin to fall upon the edible products at the leading edge thereof, as hereinbefore pointed out. This is accomplished in the manner described above. It is equally important that the actual dressing process be terminated at the trailing edge of each of the edible products 496. This is accomplished by varying the rotational velocity of the cam wheel 436, as well as by choosing the peripheral configuration thereof accordingly. As pointed out above, the motor 382 may comprise a variable speed motor of any suitable and conventional construction. In this instance, the rotational velocity of the cam wheel 436 need not be varied. Alternatively, the motor 382 may be a constant speed motor of any suitable and conventional construction, in which instance the rotational velocity of the cam wheel 436 can be varied and adjusted by varying the speed of the driven wheel 390 through the medium of vertically adjusting the position of the motor 382 relative thereto.

With particular reference now to FIGS. 32 through 39 inclusive of the drawings, wherein like reference characters indicate like parts, but wherein the reference characters are primed, a modification of the confection or icing expressing and depositing head 266 is illustrated therein.

The head 266' comprises a mounting portion 268' and a confection or icing expressing and depositing portion 298'. The icing portion 298' comprises a plate 530 having a recess 532 in one surface thereof within which a Teflon bearing plate 534 is disposed. The bearing plate 534 comprises the apertures 320' through which the confection or icing is expressed from the expressing chamber 312' for dressing the edible products. Guideposts 536 extend upwardly from the plate 530 for purposes that hereinafter will be described.

Figure 37:
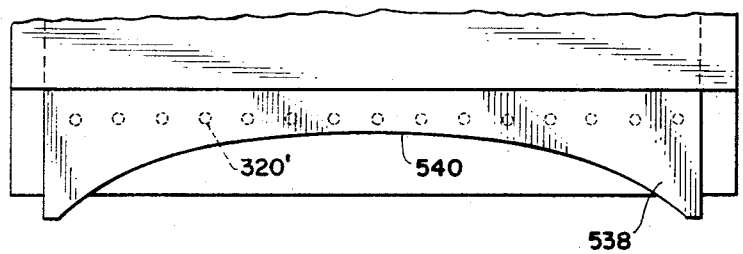
FIG. 37 is a plan view illustrating one of the positions in which the modification of FIG. 32 is disposed.
Figure 38:
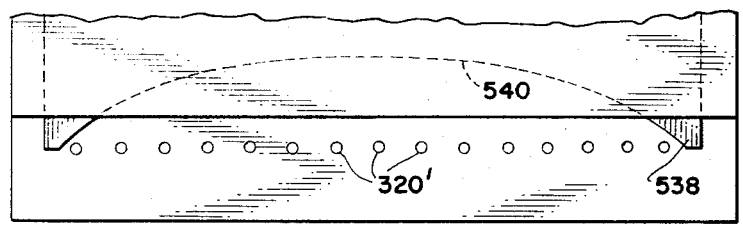
FIG. 38 is a plan view illustrating another position in which the modification of FIG. 32 is adapted to be disposed.

In lieu of the plungers 332, the confection or icing expressing and depositing head 266' comprises a reciprocal plate 538 adapted to be moved between positions in which all of the apertures 320' are exposed, as illustrated in FIG. 33, and in which the apertures are closed, as illustrated in phantom in that figure. The latter position is also illustrated in FIG. 37, while the former of such positions is also clearly illustrated in FIG. 38. The plate 538 comprises at least one edge 540, the contour, configuration and arrangement of which corresponds with the desired predetermined pattern with which the edible products is to be dressed. Accordingly, for each pattern, the edge 540 of the reciprocal plate 538 will be contoured, configured and arranged accordingly. Thus, there may be provided plates 538 capable of presenting each of the desired predetermined patterns of confection or icing hereinbefore described, as defined by the plates 370 and 370a illustrated in FIGS. 24 through 26.

The plate 538 comprises actuating ears 542 extending upwardly therefrom. The actuating rods 366' extend laterally outwardly from each of the ears 542.

The plate 538 may be fabricated of any suitable material. For example, the plate may be made of metal. It is desirable that the degree of friction between the reciprocal plate 538 and the other components of the assembly 266' be substantially minimized. Accordingly, a bearing block 544 having a recess 545 in one surface thereof within which a second bearing plate 546 preferably fabricated of Teflon, or other similar material, is disposed is adapted to cooperate with the reciprocal plate 538. That is, the latter is reciprocally slidable between the two bearing plates 532 and 546 to facilitate its movement, since this construction and arrangement of parts minimizes friction therebetween.

The bearing block 544 is adapted to be maintained in positive relative to the icing portion 298′ by a plurality of brackets 548 which are adapted to be fixed relative to the mounting portion 268′ in any suitable manner, as through the medium of suitable fasteners 550. At this point, it is noted that the mounting portion 268′ is fixedly related to the icing portion 298′ by suitable fasteners 552. As in the instance of the icing expressing and depositing assembly 266, the icing portion 298′ can be removed from the mounting portion 268′ to facilitate cleaning and repair. The brackets 548 comprise a horizontal portion 554 and a vertical portion 556. The latter serves to define the limits of the lateral position of the bearing block 544 relative to the plate 540, while the former portion serves to determine the vertical limits with respect thereto. Inasmuch as the plate 538 is reciprocal relative to the plate 530 between the bearing plates 532 and 546, it is necessary that the bearing block 544 be vertically adjustable to define the distance between the bearing plates with accuracy. To this end, the bearing block 544 comprises a plurality of adjusting struts 558 that extend upwardly therefrom, each of which has a vertically extending aperture 560. Suitable fasteners 560, which cooperate with the mounting portion 268′, are also adapted to cooperate with the vertical apertures 560.

The head 266′ is, as in the instance of the head 266, adapted to be removably positioned upon the frame 222′. To this end, there is provided a plurality of bracket assemblies 572 comprising a wall 574, a first vertical portion 576, a first horizontal portion 578, a second vertical portion 580, and a second horizontal portion 582. The second horizontal portion rests upon the bearing block 544 and, if desired, may be removably connected thereto in any suitable maner, as by suitable fasteners (not shown). The second vertical portion 580 is adapted to bear against the mounting portion 268′ and, if desired, may also be removably connected thereto by suitable fasteners (not shown). The first vertical portion 576 is adapted to bear against the frame 222′, and is adapted to be removably positioned thereupon by suitable fasteners 584.

The operation of the confection or icing depositing and expressing head 266′ is substantially the same as that of the head 266, so that a detailed description of the operation of the former is not deemed necessary. In the case of the head 266′, however, there is provided a secondary linkage assembly generally designated by the reference character 586 for causing the actuation of the plate 538. The shaft 470′ causes the actuation of the secondary or auxiliary linkage assembly 586, the latter comprising primary, secondary, and tertiary links 588, 590, and 592 respectively. The primary and secondary links 588 and 590 are operatively connected with one another by means of a connecting rod 594. The primary link 588 comprises an adjusting knob 596 enabling this link and the connecting rod 594 to be adjusted relative to one another, as through the medium of a wing-nut 598. The wall 574 of the bracket assembly 572 comprises a bearing 600 extending laterally outwardly from one side thereof. A shaft 602 extends between the bracket assemblies 572 and is rotatably journalled with respect thereto through the medium of the bearings 600. It will now be understood that the primary and secondary links 588 and 590, through the medium of the connecting rod 598, cause the rotation of the shaft 602. The tertiary links 592 are non-rotatably journalled relative to the shaft 602 on the other side of the wall 574 of each of the bracket assemblies 572. These links have bifurcated ends 604 adapted to cooperate with the actuating rods 366′. More particularly, the tertiary links 592 will cause the reciprocation of the plate 538 upon their rotation by the shaft 602. The actuating rods 366′ are subject to a compound movement relative to these links, namely, rotational movement relative thereto, and reciprocal movement along the length thereof because of the bifurcated ends 604, enabling the plate 538 to be reciprocated relative to the plate 530. It will now be understood that the guide posts 536 will function to insure proper movement of the plate 538 within the expressing chamber 312′.

In the operation of a confection or icing expressing and depositing apparatus constructed in accordance with this invention, a substantial amount of the icing may be expressed from the expressing chambers 312 or 312′ of the assemblies 266 or 266′. The removable wet section 58, as pointed out above, is constructed and arranged to remove the excess icing. However, some of the icing may begin to enter upon, and actually enter upon the outfeed section 60 of the conveyor table 42. Accordingly, it is within the scope of the present invention to provide scraper rollers 610 (FIG. 5) between the removable wet section 58, and the outfeed section 60. These rollers are adapted to be driven in the same manner as the infeed section 56, the wet section 58 and the outfeed section 60. Additionally, scraping elements (not shown) are provided in underlying relationship with the rollers to insure that any icing, or at least a substantial amount thereof, is scraped from the rollers and re-circulated in the manner aforesaid. Though not shown, similar scraper rollers may also be provided along the trailing edge of the outfeed section 60 adjacent the driven shaft 84.

As pointed out above, the infeed and outfeed sections 56 and 58, respectively, can be fabricated in any suitable manner and of any suitable material. For example, the wire endless belts of these sections may be fabricated of stainless steel. It has also been pointed out that the outfeed section 60 may be fabricated of a belt having the characteristics of an elastomer. For example, the belt may be fabricated of neoprene, or other similar material, since material, since materials of this type resist heat, and enables the excess icing to be scraped therefrom with facility. This is especially true since it is easier to mount or position scraping elements (not shown) in underlying relationship relative to an endless belt of imperforate construction. It may be desirable to chose a material having these characteristics which present a white hue. Neoprene, while it is non-toxic, may cause the confection or icing which generally is white to present a gray and therefore very distasteful appearance. This will be avoided if the conveyor belts are white.

Figure 39:
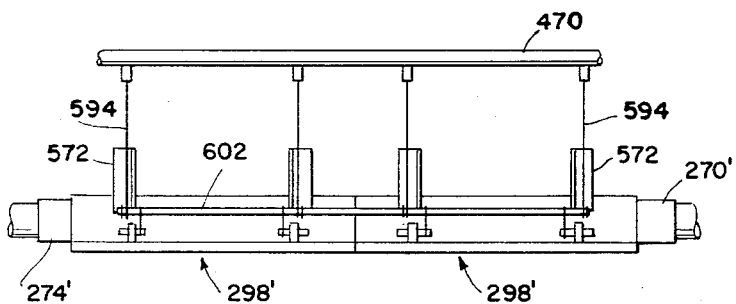
FIG. 39 is a schematic view illustrating an exemplary installation of the modification shown in FIG. 32.

With particular reference now to FIG. 39, it will be seen that the present invention encompasses within the scope thereof utilizing the icing head 266′, and even for that matter, the icing head 266, in effect in a side-by-side relationship. In this instance, there will be presented a double icing head arrangement for simultaneously dressing a plurality of edible products. The width of the conveyor table 42 may be constructed to enable two rows of edible products to simultaneously be conveyed thereby. Additional minor modifications may of necessity also be made. For example, in this instance, an additional number of the guiding fingers 254 will be provided.

In view of the foregoing, it will now be appreciated that the present invention is capable of achieving each and every one of the objects set forth at the outset of this specification, as well as others that will be apparent to those skilled in the art. An expressing and depositing apparatus for confection or icing is provided that determines with precision the point of time at which the icing operation is to begin, as well as the point in time at which to be terminated. Accordingly, confection or icing will not be deposited on the lip of the foil pan or container in which the edible products are made available to the purchasing public. As a result, covers for the pans or containers can be applied with automatic crimping machines. Additionally, when it is desired to use transparent shrink covers, the distasteful appearance of excessive icing on the lip is no longer present. The heads are adjustable with facility so that confection or icing can be expressed and deposited upon edible products in round, square or rectangular containers. Furthermore, the speed of the operation can be varied with facility, so that, for example, fifty units or edible products per minute can be expressed and deposited with the predetermined desired pattern of icing.

While the invention has been shown, illustrated, described and disclosed in terms of embodiments or modifications which it has assumed in practice, the scope of the invention should not be deemed to be limited by the precise embodiments or modifications herein shown, illustrated, described or disclosed, such other embodiments or modifications intended to be reserved especially if they fall within the scope of the claims here appended.

What is claimed is:

1. Confection or icing expressing and depositing apparatus for dressing edible products with a desired predetermined pattern comprising, in combination: a conveyor table comprising infeed and outfeed sections, and a removable wet section disposed therebetween; a signal sending-and-receiving assembly positioned upon said conveyor table; a confection or icing expressing and depositing assembly for dressing edible products that are translated therepast by said conveyor table comprising a frame positioned upon said table; a drive assembly positioned upon said frame, and comprising a motor; a rotatable cam assembly for receiving the motion at the output of said motor; a motion translating assembly positioned between the output of said motor and said cam assembly for causing the rotational movement thereof; said motion translating assembly being constructed and arranged to enable said cam assembly to rotate through only a single revolution for each signal received by the signal sending-and-receiving assembly; a linkage assembly operatively associated with said cam assembly, and being actuatable thereby; and a confection or icing expressing and depositing head positioned upon said frame, and comprising an icing portion having a plurality of apertures; means for sequentially symmetrically exposing said apertures; and actuating means operatively associated with said linkage assembly for causing the actuation of said exposing means.

2. Apparatus as defined in claim 1, wherein said frame is pivotally adjustably positioned relative to said table; and wherein said confection or icing expressing and depositing head further comprises a mounting portion for removably positioning the head upon the frame, having an inlet, an outlet, and an expressing chamber for the confection or icing disposed between the inlet and outlet; said plurality of apertures being in communication with said expressing chamber.

3. Apparatus as defined in claim 2, wherein said means for sequentially symmetrically exposing said apertures comprises a plurality of reciprocal plungers corresponding in number to the number of apertures; said plungers being reciprocal between a position in which the plungers enclose said apertures to preclude confection or icing from being expressed therethrough, and a position in which the apertures are sequentially and symmetrically exposed to the expressing chamber in said mounting portion, enabling confection or icing to be expressed therethrough; and wherein said actuating means comprises an actuating portion having a plurality of bores extending therethrough corresponding in number to the number of plungers; said actuating portion comprising adjusting means for adjusting the position of each of the plungers relative thereto enabling the plungers to present a contour, configuration and arrangement that corresponds to a desired predetermined pattern with which the edible products are to be dressed with confection or icing, as well as to the contour and configuration of the pan in which the edible products are contained; said actuating portion being reciprocal relative to said icing portion when actuated by said linkage assembly to cause the plungers to reciprocate relative thereto.

4. Apparatus as defined in claim 2, wherein said icing portion comprises a plate having a recess in one surface thereof within which a bearing plate is disposed; said apertures extending through said bearing plate; wherein there is further provided a bearing block positioned relative to said mounting portion, and having a recess in one surface thereof within which another bearing plate is disposed; wherein said means for sequentially and symmetrically exposing said apertures comprises a plate reciprocal between said bearing plates, and between a position in which all of the apertures are enclosed thereby, and a position in which the apertures are sequentially and symmetrically exposed, enabling the confection or icing to be expressed through said apertures; said plate having at least one edge the contour, configuration and arrangement of which corresponds with the desired predetermined pattern of confection or icing with which the edible products are to be dressed, as well as to the contour and configuration of the pan or pans within which the edible products are contained, and wherein said actuating means comprises a plurality of actuating ears extending from said plate, and having actuating rods extending therefrom adapted to operatively cooperate with said linkage assembly.

5. Apparatus as defined in claim 3, wherein a plurality of confection or icing expressing and depositing heads are positioned upon said frame in a side-by-side substantially horizontally aligned relationship, enabling more than one row of edible products to simultaneously be dressed with the desired predetermined pattern of confection or icing.

6. Apparatus as defined in claim 4, wherein a plurality of confection or icing expressing and depositing heads are positioned upon said frame in a side-by-side substantially horizontally aligned relationship, enabling more than one row of edible products to simultaneously be dressed with the desired predetermined pattern of confection or icing.

7. Apparatus as defined in claim 5, wherein said motor is a constant speed motor that is vertically adjustably mounted upon a motor frame, and comprises a driving and driven pulley, and means for translating the motion of one to the other extending therebetween; and wherein said motion translating assembly is positioned between said driven pulley and said cam assembly for causing the rotational movement thereof.

8. Apparatus as defined in claim 7, wherein the rotational velocity of said cam assembly is variable by vertically adjusting the position of said motor upon its frame to vary the distance between said driving and driven pulley.

9. Apparatus as defined in claim 8, wherein the frame of said confection or icing expressing and depositing assembly is vertically adjustable relative to said conveyor table.

10. Apparatus as defined in claim 9, wherein said wet section comprises a driving and a driven shaft having annular grooves therein; a plurality of endless conveyor elements extending about and between said shafts; a scraper assembly for removing confection or icing from each of said shafts, and particularly from within said grooves, said assemblies each comprising a scraper element having projections configured and arranged to cooperate with the grooves in said shafts.

11. Apparatus as defined in claim 10, wherein at least one of said scraper assemblies comprises a bracket having a scraping leg, said bracket having a plurality of grooves corresponding in number to the number of endless conveyor elements through which said elements are adapted to be translated.

12. Apparatus as defined in claim 11, wherein a plurality of scraper rollers is positioned at least between said wet section and said outfeed section.

13. Apparatus as defined in claim 12, wherein said outfeed section is defined by an imperforate endless belt fabricated of an elastomeric material, and wherein the conveyor elements of said wet section are fabricated of an elastomeric material.

14. Apparatus as defined in claim 13, wherein said signal sending-and-receiving assembly comprises a source of light adjustably positioned upon a scale along one side of said conveyor table, and a light sensor adjustably positioned upon another scale along another side of said table, enabling the light source and the sensor to be horizontally aligned with one another with precision.

References Cited

UNITED STATES PATENTS

| | | | |
|---|---|---|---|
| 2,281,169 | 4/1942 | Pattison | 118—2 |
| 2,855,891 | 10/1958 | Schmied | 118—2 |
| 3,279,422 | 10/1966 | Landers | 118—2 |

WALTER A. SCHEEL, *Primary Examiner.*

J. SHEA, *Assistant Examiner.*